United States Patent
Prados et al.

(10) Patent No.: US 10,371,797 B1
(45) Date of Patent: Aug. 6, 2019

(54) SYSTEMS AND METHODS FOR ENHANCING TARGET DETECTION

(71) Applicant: ZENDAR INC., Berkeley, CA (US)

(72) Inventors: Michael Prados, Berkeley, CA (US); Antonio Puglielli, Berkeley, CA (US); Ching Ming Wang, El Cerrito, CA (US); Vinayak Nagpal, Berkeley, CA (US)

(73) Assignee: Zendar Inc., Berkeley, CA (US)

( * ) Notice: Subject to any disclaimer, the term of this patent is extended or adjusted under 35 U.S.C. 154(b) by 0 days.

(21) Appl. No.: 16/208,442

(22) Filed: Dec. 3, 2018

Related U.S. Application Data

(60) Provisional application No. 62/675,550, filed on May 23, 2018.

(51) Int. Cl.
| | | |
|---|---|---|
| *G01S 7/28* | (2006.01) | |
| *G01S 13/86* | (2006.01) | |
| *G01S 13/93* | (2006.01) | |
| G01S 13/00 | (2006.01) | |

(52) U.S. Cl.
CPC ........... *G01S 7/2813* (2013.01); *G01S 13/86* (2013.01); *G01S 13/931* (2013.01); *G01S 2013/9375* (2013.01); *G01S 2013/9378* (2013.01)

(58) Field of Classification Search
None
See application file for complete search history.

(56) References Cited

U.S. PATENT DOCUMENTS

| | | | | |
|---|---|---|---|---|
| 4,717,916 A | * | 1/1988 | Adams | G01S 13/4454 342/107 |
| 5,117,238 A | * | 5/1992 | Silverstein | H01Q 3/26 342/196 |
| 5,144,322 A | * | 9/1992 | Gabriel | H01Q 21/22 342/383 |
| 6,411,250 B1 | | 6/2002 | Oswald et al. | |

(Continued)

OTHER PUBLICATIONS

Ahmed, I. Study of the local backprojection algorithm for image formation in ultra wideband synthetic aperture radar. Master thesis at Blekinge Institute of Technology, School of Engineering, Department of Telecommunication Systems. 2008.

Capano. Antenna basics, antenna types, antenna functions, Control Engineering Website. Aug. 2, 2014. Available at https://www.controleng.com/articles/antenna-basics-antenna-types-antenna-functions/. Accessed on Nov. 27, 2018.

(Continued)

*Primary Examiner* — Bernarr E Gregory
(74) *Attorney, Agent, or Firm* — Wilson, Sonsini, Goodrich & Rosati

(57) ABSTRACT

A system for determining a spatial disposition or a characteristic of a target external to a terrestrial vehicle is provided. The system may comprise a radar antenna array configured to transmit and receive radar signals, and a controller operatively coupled to the radar antenna array. The controller can be configured to use spatial information of the terrestrial vehicle and a spatial configuration of the radar antenna array to generate an enhanced main lobe by attenuating one or more side lobes in an effective sensitivity pattern associated with the radar antenna array or enhancing a main lobe in the effective sensitivity pattern associated with the radar antenna array. The controller can be configured to use the enhanced main lobe to determine (i) the spatial disposition of the target relative to the terrestrial vehicle or (ii) the characteristic of the target.

30 Claims, 10 Drawing Sheets

(56) References Cited

U.S. PATENT DOCUMENTS

| | | | |
|---|---|---|---|
| 6,496,158 B1* | 12/2002 | Ksienski et al. | H01Q 21/22 343/853 |
| 8,049,660 B2* | 11/2011 | Mizutani | H01Q 3/30 342/147 |
| 8,941,533 B2* | 1/2015 | Mizutani | G01S 13/48 342/147 |
| 9,791,551 B1 | 10/2017 | Eshraghi et al. | |
| 9,819,083 B1* | 11/2017 | Chen | H01Q 3/40 |
| 10,048,366 B1 | 8/2018 | Hong et al. | |
| 10,082,570 B1 | 9/2018 | Izadian et al. | |
| 2004/0104844 A1* | 6/2004 | Rooyen | H01Q 21/22 342/377 |
| 2005/0195103 A1* | 9/2005 | Davis | H01Q 21/22 342/99 |
| 2006/0114155 A1* | 6/2006 | Numminen | H01Q 3/24 342/383 |
| 2007/0021915 A1 | 1/2007 | Breed et al. | |
| 2014/0306840 A1 | 10/2014 | Koerber et al. | |
| 2015/0198711 A1 | 7/2015 | Zeng et al. | |
| 2018/0088224 A1 | 3/2018 | Kishigami | |
| 2018/0203108 A1 | 7/2018 | Nedjar et al. | |

OTHER PUBLICATIONS

Cumming, et al. Interpretations of the Omega-K algorithm and comparisons with other algorithms. Geoscience and Remote Sensing Symposium, 2003. IGARSS'03. Proceedings. 2003 IEEE International. vol. 3. IEEE, 2003.

Radar Basics. Range resolution. Available at http://www.radartutorial.eu/01.basics/Range%20Resolution.en.html. Accessed on Nov. 27, 2018.

Wikipedia website. Bandwidth-signal processing. Available at https://en.wikipedia.org/wiki/Bandwidth_(signal_processing). Accessed on Nov. 27, 2018.

Wikipedia website. Directivity. Available at https://en.wikipedia.org/wiki/Directivity. Accessed on Nov. 27, 2018.

Wikipedia website. Radiation Pattern. Available at https://en.wikipedia.org/wiki/Radiation_pattern. Accessed on Nov. 27, 2018.

Wikipedia website. Side lobe. Available at https://en.wikipedia.org/wiki/Side_lobe. Accessed on Nov. 27, 2018.

Wikipedia website. Synthetic-aperture radar. Available at https://en.wikipedia.org/wiki/Synthetic-aperture_radar. Accessed on Nov. 27, 2018.

* cited by examiner

SYSTEMS AND METHODS FOR ENHANCING TARGET DETECTION

CROSS-REFERENCE TO RELATED APPLICATION

This application claims priority to U.S. Provisional Patent Application No. 62/675,550 filed on May 23, 2018, which application is incorporated herein by reference in its entirety for all purposes.

BACKGROUND

RAdio Detection And Ranging (radar) can be used in many applications including object detection, range-finding, direction-finding and mapping. Traditionally, radar has been used in aerial vehicles, satellites, and maritime vessels to locate objects and image terrain. In recent years, radar is finding increasing use in automobiles for applications such as blind-spot detection, collision avoidance, and autonomous driving. Unlike optical-based sensors (such as cameras or Light Detection and Ranging (LIDAR) systems) which are affected by changing weather and visibility, radar is capable of functioning in low light conditions, in the dark, and under all types of weather conditions.

However, existing automotive radar technology may lack the required resolution to (1) sense different objects, (2) distinguish between closely spaced objects, or (3) detect characteristics of objects on the road or in the surrounding environment. The resolution of existing automotive radar systems may be limited in both azimuth and elevation. Additionally, existing automotive radar systems tend to have a limited number of antennas and/or antenna channels, and limited aperture size due to constraints imposed by automotive vehicle body size.

To improve angular resolution, some detection systems may use multiple antennas. Such systems may need a large number of antennas spaced apart at a certain distance in order to achieve improved angular resolution. However, such systems often require additional components and sensors that are cost prohibitive for commercial automotive use. Furthermore, the total physical size of such systems may make it impractical to implement such systems on terrestrial vehicles.

With the recent emphasis on autonomous driving, there is a need for long range detection systems on automotive vehicles that can provide advance notice to drivers about potential obstacles or dangers on the roads. However, existing automotive radar technology may not be ready and/or suitable for deployment in long range detection systems on automotive vehicles, in view of at least the challenges described above.

SUMMARY

A need exists for a forward and/or rear facing high resolution radar system on a terrestrial vehicle that can be used to accurately detect targets and spatial dispositions and/or characteristics of the targets as the terrestrial vehicle is moving through an environment. A high resolution radar system as disclosed herein can be a radar system capable of distinguishing between multiple targets that are very close to one another in bearing with respect to the radar system. The radar system may achieve higher resolution by improving azimuth resolution, elevation resolution, or any combination thereof. Azimuth resolution is the ability of a radar system to distinguish between objects at similar range but different bearings. Elevation resolution is the ability of a radar system to distinguish between objects at similar range but different elevation. Azimuth and elevation resolution may be a function of radar array geometry. The radar system can accurately detect targets and/or characteristics of targets if it can sense the presence of one or more targets, distinguish one or more targets as separate targets, and/or determine some physical properties of one or more targets.

The systems and methods disclosed herein can be implemented using any radar antenna array (for example, a millimeter wavelength radar antenna array that is relatively low cost, compact and readily commercially available). The radar systems disclosed herein can have an angular resolution that enables accurate measurement and tracking of vehicle position using returns from the radar antenna array. The radar antenna array may be a sparse antenna array. The sparse antenna array may have multiple antennas that are spaced further apart than the antennas in a typical fully-sampled array, where adjacent antenna elements are separated by at most one-half of a wavelength of the radar signals transmitted and/or received by the radar system. If adjacent antennas in a fully-sampled array are separated by more than about one-half of a wavelength of the radar signals, the radar systems may exhibit aliasing side lobes in its directional response. An aliasing side lobe may be a peak in the radar system's directional response which may not necessarily correspond to a true physical location of a target. The systems and methods disclosed herein may improve the angular resolution of a radar system with a sparse antenna array by suppressing aliasing side lobes in the sparse antenna array radar system's directional response. By minimizing aliasing sidelobes generated by a sparse antenna array, the systems and methods disclosed herein can achieve a similar resolution with a sparse antenna array as a fully-sampled array while using fewer radar antennas.

In an aspect, the present disclosure provides systems and methods for determining a spatial disposition or a characteristic of a target external to a terrestrial vehicle. The system may comprise a radar antenna array and at least one controller operatively coupled to the radar antenna array. The radar antenna array may be mountable on a terrestrial vehicle. The radar antenna array may be configured to transmit successive radar pulses and receive a plurality of signals corresponding to at least a subset of the successive radar pulses. The plurality of signals may be generated upon the at least a subset of the successive radar pulses interacting with the target. An effective sensitivity pattern may be obtained from the plurality of signals. The effective sensitivity pattern may be associated with the radar antenna array. The effective sensitivity pattern may comprise a main lobe and a side lobe. The side lobe may comprise an aliasing side lobe. The at least one controller may be operatively coupled to the radar antenna array. The at least one controller may be configured to use spatial information of the terrestrial vehicle while the terrestrial vehicle is in motion and a spatial configuration of the radar antenna array to provide an enhanced main lobe. The enhanced main lobe may be provided by attenuating the side lobe relative to the main lobe or by enhancing the main lobe relative to the side lobe. The controller may be configured to use the enhanced main lobe to determine the spatial disposition or characteristic of the target.

In some embodiments, the radar antenna array may comprise a transmitting antenna and a receiving antenna. In some embodiments, the radar antenna array may comprise a virtual antenna. In some embodiments, the radar antenna array may be configured to be mounted on the terrestrial vehicle in a forward-facing direction or in a reverse-facing direction relative to the direction of motion of the terrestrial vehicle.

In some embodiments, the spatial configuration of the radar antenna array may be based at least in part on an imaging region and an angular resolution with a field of detection of the radar antenna array. In some embodiments, an aperture size of the radar antenna array may be based at least in part on the angular resolution and an operating wavelength of the radar antenna array. In some embodiments, the at least one controller may be configured to use the angular resolution and the operating wavelength of the radar antenna array at least in part to define a distance traveled by the terrestrial vehicle. In some embodiments, the side lobe in an effective sensitivity pattern may be located at an angular distance from the main lobe in an effective sensitivity pattern. In some embodiments, the spatial configuration of the radar antenna array may comprise a spacing between adjacent antennas of the radar antenna array such that the angular distance may be greater than the imaging region. In some cases, the adjacent antennas of the radar antenna array may be distributed at a spacing such that the side lobe lies outside of the imaging region. In some cases, the imaging region may be defined separately for azimuth and elevation angles. In some cases, the imaging region may cover at least ±10 degrees from a forward or reverse direction of motion of the terrestrial vehicle. In some cases, the imaging region may cover no more than ±60 degrees from a forward or reverse direction of motion of the terrestrial vehicle.

In some embodiments, the spatial information of a terrestrial vehicle may comprise a distance traveled by the terrestrial vehicle. The spatial configuration of the radar antenna array may comprise a spacing between adjacent antennas of the radar antenna array. The controller may be configured to attenuate the side lobe relative to the main lobe or to enhance the main lobe relative to the side lobe to provide an enhanced main lobe. The controller may be configured to provide an enhanced main lobe based at least in part on the distance traveled by the terrestrial vehicle and the spacing between adjacent antennas of the radar antenna array.

In some embodiments, the spatial configuration of the radar antenna array may comprise a spacing between adjacent antennas of the radar antenna array. The spacing may be greater than one-half of an operating wavelength of the radar antenna array. In some cases, the spacing may be at least 10% greater than one-half of the operating wavelength of the radar antenna array. In some cases, the spacing may be greater than about 2 millimeters.

In some embodiments, the radar antenna array may be configured to transmit successive radar pulses at a pulse repetition frequency such that when the terrestrial vehicle is in motion, a change in position of the terrestrial vehicle between two successive radar pulses may be from about one-quarter to about six times an operating wavelength of the radar antenna array. In some cases, the change in position of the terrestrial vehicle between two successive radar pulses may be less than about one-half of the operating wavelength of the radar antenna array.

In some embodiments, the at least one controller may be configured to obtain position information of the terrestrial vehicle using a vehicle position sensor. The vehicle position sensor may comprise at least one member selected from the group consisting of an inertial measurement unit, a global positioning system sensor, a camera, a light detection and ranging unit, a wheel encoder, and a radar. In some cases, the vehicle position sensor may be located separately from the radar antenna array. The vehicle position sensor may be configured to be mounted to the terrestrial vehicle.

In some embodiments, the at least one controller may be configured to determine spatial dispositions or characteristics of a plurality of targets by attenuating the plurality of side lobes associated with the plurality of targets or by enhancing a plurality of main lobes associated with the plurality of targets to provide a plurality of enhanced main lobes. The plurality of targets may comprise the target. In some cases, the at least one controller may be configured to differentiate between the spatial dispositions or characteristics of the plurality of targets after the plurality of side lobes have been attenuated or the plurality of main lobes have been enhanced.

In some embodiments, the system may be configured to perform a method for identifying a position of a target. The method may comprise collecting radar data from an environment external to the terrestrial vehicle using a radar antenna array mounted on the terrestrial vehicle. The radar data may comprise a main lobe and a side lobe. The side lobe may be an aliasing side lobe. The method may further comprise collecting position information of the terrestrial vehicle. The method may further comprise using at least the position information to attenuate the side lobe relative to the main lobe or to enhance the main lobe relative to the side lobe to yield an enhanced main lobe. The method may further comprise using the enhanced main lobe to identify the position of the target in the environment at a detection accuracy of at least 90%. The target may have a size of at least 0.2 meters. The target may be located at a distance of at least 1 meter from the terrestrial vehicle. In some cases, the radar antenna array may be provided on a front side of the terrestrial vehicle in a forward-facing direction of the terrestrial vehicle. In some cases, the radar antenna array may be provided on a rear side of the terrestrial vehicle in a rear-facing direction of the terrestrial vehicle.

In some cases, the system may be configured to perform a method for determining a spatial disposition or characteristic of a target. The method may comprise providing a radar antenna array on a terrestrial vehicle. The method may further comprise transmitting successive radar pulses and receiving a plurality of signals corresponding to at least a subset of the successive radar pulses with the aid of the radar antenna array. The plurality of signals may be generated upon the at least a subset of the successive radar pulses interacting with the target. An effective sensitivity pattern associated with the radar antenna array may be obtainable from the plurality of signals. The effective sensitivity pattern may comprise a main lobe and a side lobe. The side lobe may comprise an aliasing side lobe. The method may further comprise using position information of the terrestrial vehicle while the vehicle is in motion and a spatial configuration of the radar antenna array to provide an enhanced main lobe. The enhanced main lobe may be provided by using position information of the terrestrial vehicle while the vehicle is in motion and a spatial configuration of the radar antenna array to attenuate the side lobe relative to the main lobe or to enhance the main lobe relative to the side lobe. The method may further comprise using the enhanced main lobe to determine the spatial disposition or characteristic of the target. In some cases, the spatial disposition or characteristic of the target may be determined substantially in real time while the terrestrial vehicle is in motion relative to the target. In some cases, the radar antenna array may be mounted on the terrestrial vehicle in a forward-facing direction relative to the direction of motion of the terrestrial vehicle. In some cases, the radar antenna array may be mounted on the terrestrial vehicle in a rear-facing direction relative to the direction of motion of the terrestrial vehicle. In some cases, the spatial configuration of the radar antenna array may comprise a spacing between adjacent antennas of the radar antenna array. The spacing may be greater than one-half of an operating wavelength of the radar antenna array. In some cases, the method may further comprise determining spatial dispositions or characteristics of a plurality of targets by attenuating a plurality of sidelobes associated with the plurality of targets or by enhancing a plurality of main lobes associated with the plurality of targets, to provide a plurality of enhanced main lobes. The plurality of targets may comprise the target. In some cases, the method may further comprise differentiating between the spatial dispositions or characteristics of the plurality of targets after the plurality of side lobes have been attenuated or the plurality of main lobes have been enhanced.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

Figure 1A:
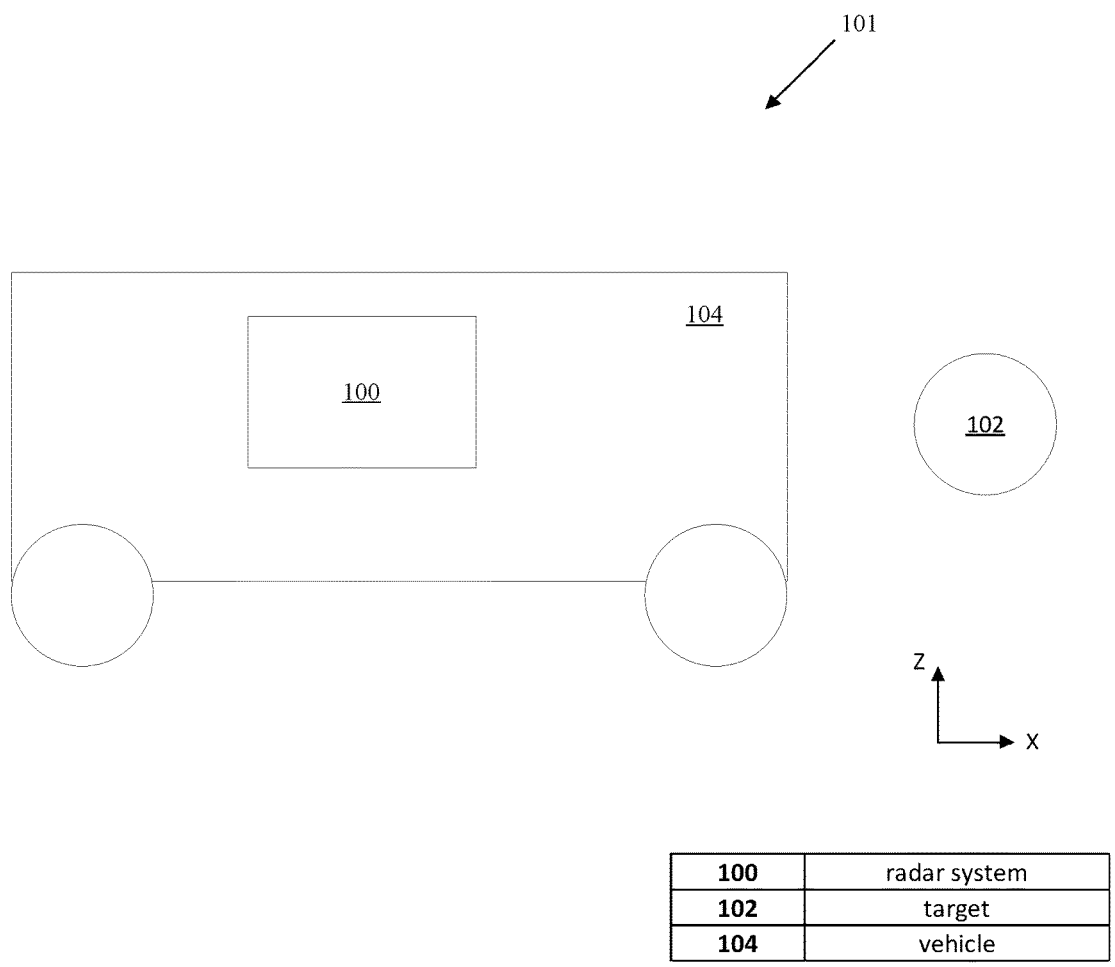
FIG. 1A illustrates a system that can be used on a vehicle to detect one or more targets in a surrounding environment, in accordance with some embodiments.

While various embodiments of the present disclosure have been shown and described herein, it will be obvious to those skilled in the art that such embodiments are provided by way of example only. Numerous variations, changes, and substitutions may occur to those skilled in the art without departing from the present disclosure. It should be understood that various alternatives to the embodiments of the present disclosure described herein may be employed.

The term "terrestrial vehicle," as used herein, generally refers to a vehicle that is configured to operate by contacting the ground or at a location below the ground. In some examples, the terrestrial vehicle is a car, bus, train, truck, bicycle, motorcycle, scooter, boat, submarine, or any transportation device for use on the ground. The terrestrial vehicle can be a car. The terrestrial vehicle can be any machinery that normally operates by contacting the ground or operating below ground, such as, for example, a robot for ground use. The terrestrial vehicle may not be capable of operating in the air or in space. For example, the terrestrial vehicle may not be a plane or a helicopter.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

The present disclosure provides systems and methods that can improve detection of objects from terrestrial vehicles. Existing automotive radar technology may lack the required resolution to (1) sense different objects, (2) distinguish between closely spaced objects, or (3) detect characteristics of objects on the road or in the surrounding environment. Furthermore, existing automotive radar systems tend to have a limited number of antennas and/or antenna channels and limited aperture size due to constraints imposed by automotive vehicle body size. The systems and methods disclosed herein can improve the resolution of a radar-based target detection system on a terrestrial vehicle, for example, by using vehicle position information and a Synthetic Aperture Radar to suppress aliasing sidelobes that may be generated in the directional response of a sparse antenna array. A SAR system as disclosed herein can provide high resolution radar imagery from a moving terrestrial platform or terrestrial vehicle by using the motion path of the platform or vehicle to simulate a large antenna or aperture electronically and/or virtually.

A typical radar system may comprise a fully-sampled radar antenna array. A fully-sampled radar antenna array may be a radar antenna array configured such that adjacent antenna elements are separated by at most one-half of a wavelength of the radar signals transmitted and/or received by the radar system. If adjacent antennas are separated by more than about one-half of a wavelength of the radar signals, the radar system may exhibit aliasing side lobes in its directional response. An aliasing side lobe may be a peak in a radar system's directional response which may not correspond to a true physical location of a target. A sparse antenna array radar system may be a radar system that comprises a sparse antenna array. A sparse antenna array may be a radar antenna array with multiple antennas that are spaced further apart than the antennas in a typical fully-sampled array. The systems and methods disclosed herein may improve the angular resolution of a sparse antenna array radar system by suppressing aliasing side lobes in the sparse antenna array radar system's directional response. By minimizing aliasing sidelobes generated by the sparse antenna array radar system, the systems and methods disclosed herein can achieve a similar resolution with a sparse antenna array as a fully-sampled array while also using fewer radar antennas.

FIG. 1A shows a system 100 that may be used on a vehicle 104 to determine a spatial disposition or characteristic of one or more targets 102 in a surrounding environment 101. The system may be mounted to any side of the vehicle, or to one or more sides of the vehicle, e.g. a front side, rear side, lateral side, top side, or bottom side of the vehicle. In some cases, the system may be mounted between two adjacent sides of the vehicle. The system may be oriented to detect one or more targets in front of the vehicle, behind the vehicle, or to the lateral sides of the vehicle.

The system may comprise any one or more elements of a conventional radar system, a phased array radar system, an AESA (Active Electronically Scanned Array) radar system, a synthetic aperture radar (SAR) system, a MIMO (Multiple-Input Multiple-Output) radar system, and/or a phased-MIMO radar system. A conventional radar system may be a radar system that uses radio waves transmitted by a transmitting antenna and received by a receiving antenna to detect objects. A phased array radar system may be a radar system that manipulates the phase of one or more radio waves transmitted by a transmitting and receiving module and uses a pattern of constructive and destructive interference created by the radio waves transmitted with different phases to steer a beam of radio waves in a desired direction. An AESA radar system may be a phased array radar system that uses one or more transmitting and receiving modules to produce one or more beams of radio waves at different phases and/or frequencies. A synthetic aperture radar system may be a phased array radar system that uses a single antenna to combine multiple raw radar returns from different geometric positions into coherent focused images. A MIMO radar system may be a radar system that uses multiple transmitting antennas to transmit one or more signals independently of other transmitting antennas and multiple receiving antennas to receive the one or more signals transmitted by the transmitting antennas independently of other receiving antennas. A phased-MIMO radar system may be a radar system comprising one or more components or features of a phased array radar system or a MIMO radar system.

The methods and systems disclosed herein may be applied to any suitable terrestrial vehicle. A terrestrial vehicle may be a motor vehicle or any other vehicle that uses a source of energy, renewable or nonrenewable, (solar, thermal, electrical, wind, petroleum, etc.) to move across or in close proximity to the ground (within 1 meter, 2 meter, 3 meter, etc.). The terrestrial vehicle may be a self-driving vehicle or may be operated by a living subject, such as a human or animal. The terrestrial vehicle may be stationary, moving, or capable of movement.

The methods and systems disclosed herein may be applied to any suitable aerial vehicle. An aerial vehicle may be a motor vehicle or any other vehicle that uses a source of energy, renewable or nonrenewable, (solar, thermal, electrical, wind, petroleum, etc.) to move through the air or through space. The aerial vehicle may be a self-driving vehicle or may be operated by a living subject, such as a human or animal. The aerial vehicle may be stationary, moving, or capable of movement.

The methods and system disclosed herein may be applied to any suitable aquatic vehicle. An aquatic vehicle may be a motor vehicle or any other vehicle that uses a source of energy, renewable or nonrenewable, (solar, thermal, electrical, wind, petroleum, etc.) to move across or through water. The aquatic vehicle may be a self-driving vehicle or may be operated by a living subject, such as a human or animal. The aquatic vehicle may be stationary, moving, or capable of movement.

The vehicle may be a land-bound vehicle. The vehicle may travel over land. Alternatively or in addition, the vehicle may be capable of traveling on or in water, underground, in the air, and/or in space. The vehicle may be an automobile. The vehicle may be a land-bound vehicle, watercraft, aircraft, and/or spacecraft. The vehicle may travel freely over a surface. The vehicle may travel freely within two or more dimensions. The vehicle may primarily drive on one or more roads.

Optionally, the vehicle may be an unmanned vehicle. The vehicle may not have a passenger or operator on-board the vehicle. The vehicle may or may not have a space within which a passenger could ride. The vehicle may or may not have space for cargo or objects to be carried by the vehicle. The vehicle may or may not have tools that may permit the vehicle to interact with the environment (e.g., collect samples, move objects). The vehicle may or may not have objects that may be emitted to be dispersed to the environment (e.g., light, sound, liquids, pesticides). The vehicle may operate without requiring a human operator.

In some embodiments, the vehicle may permit one or more passengers to ride on-board the vehicle. The vehicle may comprise a space for one or more passengers to ride the vehicle. The vehicle may have an interior cabin with space for one or more passengers. The vehicle may or may not have an operator. For example, a vehicle may have a space for a driver of the vehicle. In some embodiments, the vehicle may be capable of being driven by a human operator. Alternatively or in addition, the vehicle may be operated using an autonomous driving system.

In some embodiments, a vehicle may switch between a manual driving mode during which a human driver would drive the vehicle, and an autonomous driving mode during which an automated controller may generate signals that operate the vehicle without requiring intervention of the human driver. In some embodiments, the vehicle may provide driver assistance where the driver may primarily manually drive the vehicle, but the vehicle may execute certain automated procedures or assist the driver with performing certain procedures (e.g., lane changes, merging, parking, auto-braking). In some embodiments, the vehicle may have a default operation mode. For example, the manual driving mode may be a default operation mode, or an autonomous driving mode may be a default operation mode.

A target may be any object external to the vehicle. A target may be a living being or an inanimate object. A target may be a pedestrian, an animal, a vehicle, a building, a sign post, a sidewalk, a sidewalk curb, a fence, a tree, or any object that may obstruct a vehicle travelling in any given direction. A target may be stationary, moving, or capable of movement.

A target may be located in the front, rear, or lateral side of the vehicle. A target may be positioned at a range of about 1, 2, 3, 4, 5, 10, 15, 20, 25, 50, 75, or 100 meters from the vehicle. A target may be located on the ground, in the water, or in the air. A target may be oriented in any direction relative to the vehicle. A target may be orientated to face the vehicle or oriented to face away from the vehicle at an angle ranging from 0 to 360 degrees. In some embodiments, a target may comprise multiple targets external to a terrestrial vehicle.

A target may have a spatial disposition or characteristic that may be measured or detected. Spatial disposition information may include information about the position, velocity, acceleration, and other kinematic properties of the target relative to the terrestrial vehicle. A characteristic of a target may include information on the size, shape, orientation, and material properties, such as reflectivity, of the target.

In some embodiments, a target may have a size of at least 0.2 meters, be in a side facing direction of a terrestrial vehicle, and be at least about 1 meter from a terrestrial vehicle. In some embodiments, a target may have a size of at least 0.2 meters, be in a forward or rear facing direction of a terrestrial vehicle, and be at least about 1 meter from a terrestrial vehicle.

A surrounding environment may be a location and/or setting in which the vehicle may operate. A surrounding environment may be an indoor or outdoor space. A surrounding environment may be an urban, suburban, or rural setting. A surrounding environment may be a high altitude or low altitude setting. A surrounding environment may include settings that provide poor visibility (night time, heavy precipitation, fog, particulates in the air). A surrounding environment may include targets that are on a travel path of a vehicle. A surrounding environment may include targets that are outside of a travel path of a vehicle. A surrounding environment may be an environment external to a vehicle.

Figure 1B:
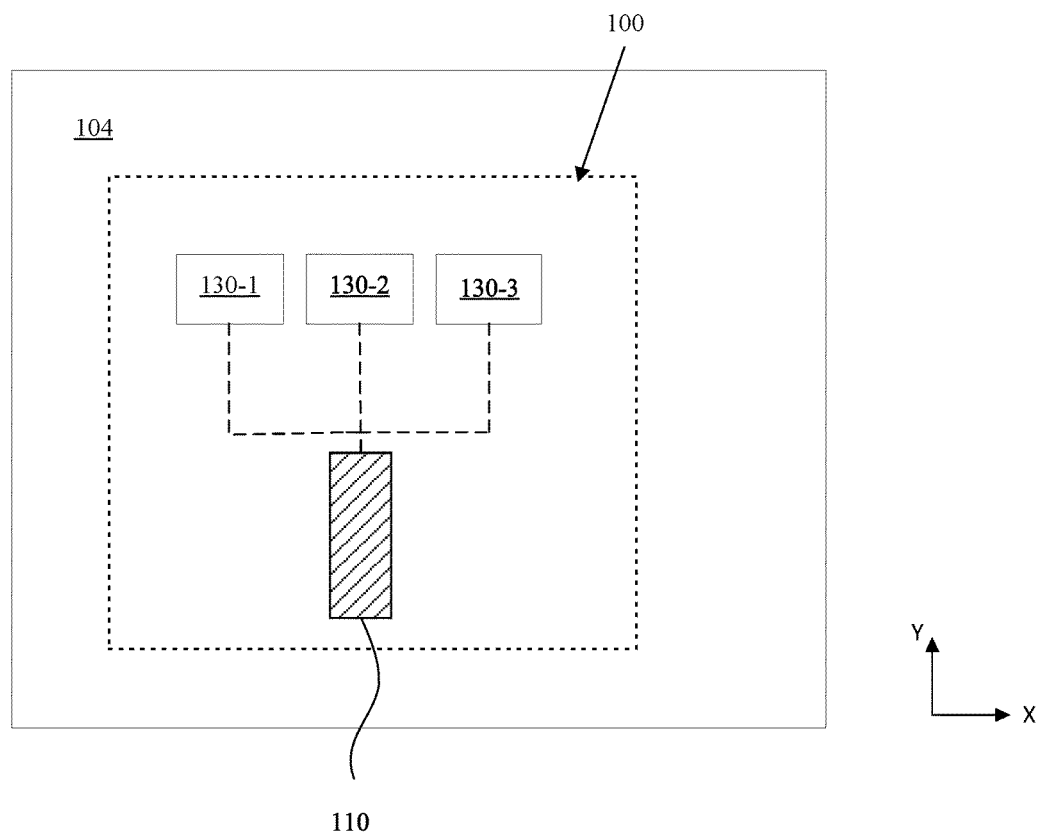
FIG. 1B illustrates one or more controllers operatively coupled to a radar antenna array, in accordance with some embodiments.

As illustrated in FIG. 1B, system 100 may include a radar antenna array 110 and one or more controllers 130-1, 130-2, 130-3. The one or more controllers may be operatively coupled to the radar antenna array. The controller may be implemented onboard the terrestrial vehicle 104 or off-site on a server. The controller may comprise a computer processor, application specific integrated circuit, a graphics processing unit, or a field programmable gate array.

Figure 2A:
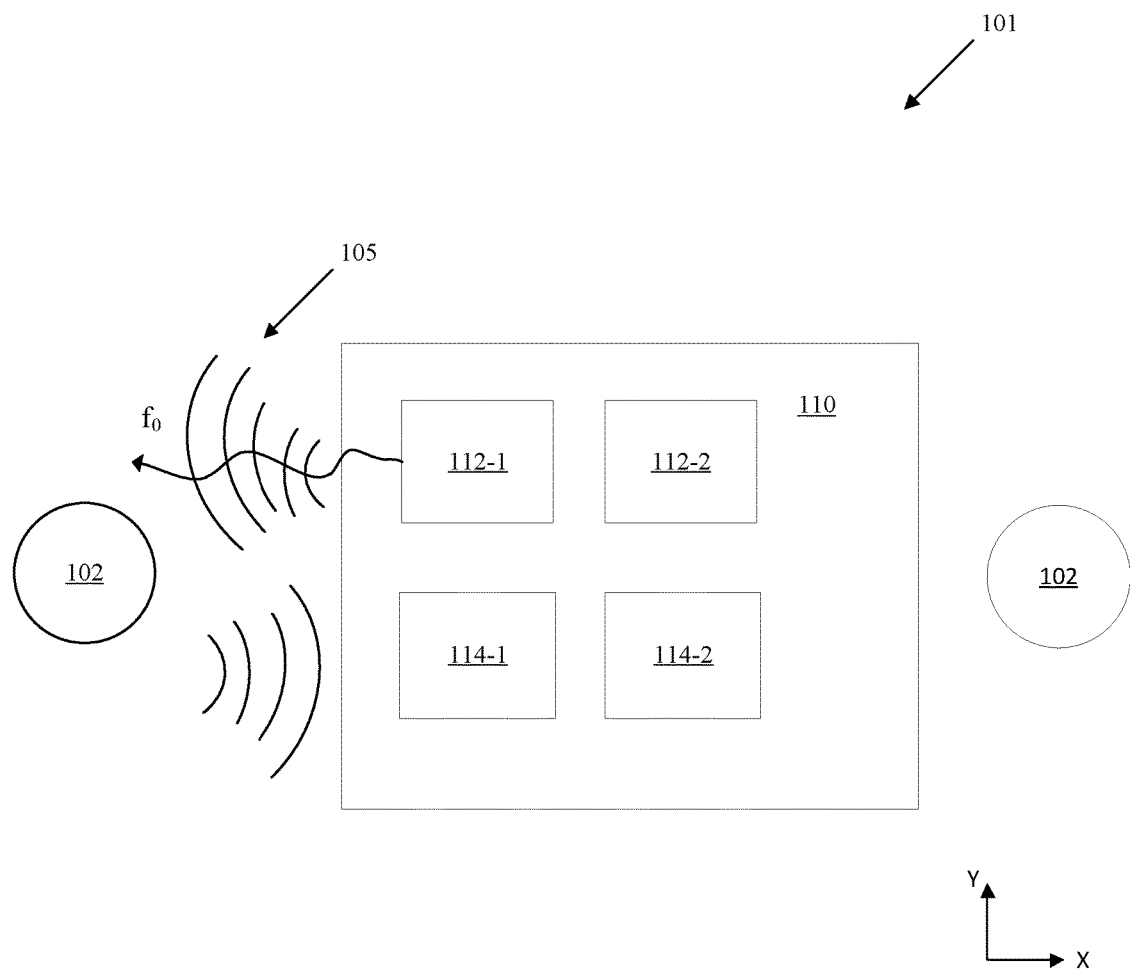
FIG. 2A illustrates a radar antenna array, in accordance with some embodiments.

FIG. 2A shows a radar antenna array 110. The radar antenna array may comprise a conventional radar system, a phased array radar system, an AESA (Active Electronically Scanned Array) radar system, a synthetic aperture radar (SAR) system, a MIMO (Multiple-Input Multiple-Output) radar system, or a phased-MIMO radar system. A conventional radar system may be a radar system that uses radio waves transmitted by a transmitting antenna and received by a receiving antenna to detect objects. A phased array radar system may be a radar system that manipulates the phase of one or more radio waves transmitted by a transmitting and receiving module and uses a pattern of constructive and destructive interference created by the radio waves transmitted with different phases to steer a beam of radio waves in a desired direction. An AESA radar system may be a phased array radar system that uses one or more transmitting and receiving modules to produce one or more beams of radio waves at different phases and/or frequencies. A synthetic aperture radar system may be a phased array radar system that uses a single antenna to combine multiple raw radar returns from different geometric positions into coherent focused images. A MIMO radar system may be a radar system that uses multiple transmitting antennas to transmit a signal independently of other transmitting antennas and multiple receiving antennas to receive the one or more signals transmitted by the transmitting antennas independently of other receiving antennas. A phased-MIMO radar system may be a radar system comprising one or more components or features of a phased array radar system or a MIMO radar system.

The radar antenna array may be configured to be mounted to a front side, rear side, or lateral side of a terrestrial vehicle. The radar antenna array may be mounted to any side of the vehicle, or to one or more sides of the vehicle, e.g. a front side, rear side, lateral side, top side, and/or bottom side of the vehicle. In some cases, the radar antenna array may be mounted between two or more adjacent sides of the vehicle.

The radar antenna array may be configured to transmit one or more radar pulses. A radar pulse may be any electromagnetic wave transmitted by the radar antenna array within a frequency range of about 1 Hz to about 300 GHz. The one or more radar pulses may be successive radar pulses transmitted repeatedly by the radar antenna array at a pre-defined frequency.

The successive radar pulses may be transmitted at a pre-defined frequency equal to a pulse repetition frequency. A pulse repetition frequency may be a rate at which the radar antenna array repeatedly transmits the successive radar pulses. The pulse repetition frequency may be less than or equal to 9 KHz. The pulse repetition frequency may be greater than 9 KHz. The pulse repetition frequency may be 1 KHz, 2 KHz, 3 KHz, 4 KHz, 5 KHz, 6 KHz, 7 KHz, 8, KHz, 9 KHz, or any value between 1 KHz and 9 KHz. In some embodiments, the pulse repetition frequency may preferably range from about 7 KHz to about 9 KHz. The pulse repetition frequency of the radar system may be designed based on maximum vehicle speed. The pulse repetition frequency may be designed so that the time between successive radar pulses corresponds to a vehicle travel distance that is less than a value S. S may be less than 1.5 mm or greater than 2 mm. S may be equal to 1.5 mm or equal to 2 mm. S may be greater than or equal to 1.5 mm. S may be less than or equal to 2 mm. S may 1.5 mm, 1.6 mm, 1.7 mm, 1.8 mm, 1.9 mm, 2 mm, or any value between 1.5 mm and 2 mm.

The radar antenna array may be configured to receive a plurality of signals. The plurality of signals may be a subset of the successive radar pulses that are transmitted by the radar antenna array and reflected back to the radar antenna array after interacting with external targets.

As illustrated in FIG. 2A, the radar antenna array 110 may include a transmitting antenna 112 and a receiving antenna 114. In some embodiments, the radar antenna array may include one or more transmitting antennas 112-1, 112-2 and/or one or more receiving antennas 114-1, 114-2. The radar antenna array may be used to detect one or more targets 102 in a surrounding environment 101.

A transmitting antenna may be any antenna (dipole, directional, patch, sector, Yagi, parabolic, grid) that can convert electrical signals into electromagnetic waves and transmit the electromagnetic waves. In some embodiments, one or more transmitting antennas may be used to transmit one or more radar pulses. A radar pulse may be any electromagnetic wave transmitted by the transmitting antenna within a frequency range of about 1 Hertz (Hz) to about 300 GigaHertz (GHz). The one or more radar pulses may be successive radar pulses transmitted repeatedly by the one or more transmitting antennas at a pre-defined frequency.

As illustrated in FIG. 2A, the successive radar pulses 105 may have a center frequency $f_0$. A center frequency may be an arithmetic or geometric mean of a lower and upper cutoff frequency of a radar system. A cutoff frequency may be an upper or lower boundary in a radar system's frequency response at which signal attenuation begins to increase rapidly. The cutoff frequency may be defined as the frequency at which the ratio of power output to power input has a magnitude of about 0.707. The successive radar pulses may have a wavelength associated with the center frequency of the successive radar pulses transmitted by a transmitting antenna.

The one or more radar pulses may be transmitted at a pre-defined frequency equal to a pulse repetition frequency. A pulse repetition frequency may be a rate at which one or more transmitting antennas repeatedly transmit the successive radar pulses. The pulse repetition frequency may be less than or equal to 9 KHz. The pulse repetition frequency may be greater than 9 KHz. The pulse repetition frequency may be at least about 1 KHz, 2 KHz, 3 KHz, 4 KHz, 5 KHz, 6 KHz, 7 KHz, 8, KHz, 9 KHz, or any value between 1 KHz and 9 KHz. In some embodiments, the pulse repetition frequency may preferably range from about 7 KHz to about 9 KHz. The pulse repetition frequency of the radar system may be designed based on maximum vehicle speed. The pulse repetition frequency may be designed so that the time between successive radar pulses corresponds to a vehicle travel distance that is less than a value S. S may be less than 1.5 millimeter (mm) or greater than 2 mm. S may be equal to 1.5 mm or equal to 2 mm. S may be greater than or equal to 1.5 mm. S may be less than or equal to 2 mm. S may be at least about 1.5 mm, 1.6 mm, 1.7 mm, 1.8 mm, 1.9 mm, 2 mm, or any value between 1.5 mm and 2 mm. In some cases, S may be equal to about one-half of a wavelength corresponding to the center frequency $f_0$ of the successive radar pulses. In some cases, the pulse repetition frequency may be chosen such that the distance traveled by a terrestrial vehicle is less than about one-half a wavelength corresponding to the center frequency of the successive radar pulses.

A receiving antenna may be any antenna (dipole, directional, patch, sector, Yagi, parabolic, grid) that can receive electromagnetic waves and convert the radiofrequency radiation waves into electrical signals. The receiving antenna may be used to receive a subset of the successive radar pulses that are transmitted by the transmitting antenna and reflected back to the receiving antenna after interacting with external targets. In some embodiments, one or more receiving antennas may be used to receive a subset of the successive radar pulses that are transmitted by one or more transmitting antennas and reflected back to the one or more receiving antennas after interacting with external targets.

The radar antenna array may have a spatial configuration. The spatial configuration may involve a fixed position, a fixed orientation, or a combination of either a fixed position and/or a fixed orientation. The radar antenna array may have a fixed position relative to one or more sides of a terrestrial vehicle. The radar antenna array may be configured to be mounted to a front side, rear side, or lateral side of a terrestrial vehicle. The radar antenna array may be mounted to any side of the vehicle, or to one or more sides of the vehicle, e.g. a front side, rear side, lateral side, top side, and/or bottom side of the vehicle. In some cases, the radar antenna array may be mounted between two or more adjacent sides of the vehicle. The radar antenna array may have a fixed orientation relative to the path of motion of a vehicle. The radar antenna array may be oriented in any direction from 0 degrees to 360 degrees in azimuth angle and/or elevation angle relative to the path of motion of a vehicle. In some embodiments, the radar antenna array may be configured to be mounted in a forward-facing direction relative to the direction of motion of a terrestrial vehicle. In other embodiments, the radar antenna array may be configured to be mounted in a reverse-facing direction relative to the direction of motion of a terrestrial vehicle.

In some embodiments, the spatial configuration of the radar antenna array may involve a fixed spatial configuration between adjacent transmitting and/or receiving antennas in a radar antenna array. The radar antenna array may comprise a transmitting antenna and a receiving antenna arranged in a fixed spatial configuration relative to one another. In some embodiments, the transmitting and receiving antenna may be arranged so that they are in the same plane. In other embodiments, the transmitting and receiving antenna may or may not be on substantially the same plane. For example, the transmitting antenna may be on a first plane and the receiving antenna may be on a second plane. The first plane and second plane may be parallel to one another. Alternatively, the first and second planes need not be parallel, and may intersect one another. In some cases, the first plane and second plane may be perpendicular to one another.

The transmitting and receiving antenna may or may not be at the same elevation above ground or at different elevations above ground. There transmitting and receiving antenna may or may not have a vertical or horizontal degree of orientation. A vertical degree of orientation may be less than or equal to about 90 degrees, 80 degrees, 70 degrees, 60 degrees, 50 degrees, 40 degrees, 30 degrees, 20 degrees, 10 degrees, 5 degrees, 3 degrees, or 1 degree. A horizontal degree of orientation may be less than or equal to about 90 degrees, 80 degrees, 70 degrees, 60 degrees, 50 degrees, 40 degrees, 30 degrees, 20 degrees, 10 degrees, 5 degrees, 3 degrees, or 1 degree.

The transmitting and receiving antenna may be arranged to have the same vertical degree of orientation. For instance, the transmitting and receiving antenna may be arranged with zero degrees of vertical orientation. In another example, the transmitting and receiving antenna may be angled slightly upwards, or may be angled slightly downwards. Alternatively, the transmitting and receiving antenna may have slightly different vertical orientations. For example, one transmitting and/or receiving antenna may be angled slightly upwards, while the other transmitting and/or receiving antenna may be angled slightly downwards or straight horizontally. In some embodiments, the transmitting and receiving antenna may have slightly different horizontal and/or vertical orientations or substantially different horizontal and/or vertical orientations. The variations in horizontal and/or vertical orientations may allow the system to detect different objects of various heights (e.g., children who may be below a certain height and not easily detected, small animals such as pets, bicycles, motorcycles, trucks such as 18-wheelers, trucks with tailgates, etc.).

In some cases, a transmitting antenna may be aligned in a first direction and a receiving antenna may be aligned in a second direction. An angle between the first direction and the second direction may range from 0 degrees to 360 degrees in the XY plane, the XZ plane, or the YZ plane. The angle between the first direction and second direction may be 0 degrees, 45 degrees, 90 degrees, 135 degrees, 180 degrees, 225 degrees, 270 degrees, 315 degrees, 360 degrees, or any value between 0 degrees and 360 degrees. Alternatively, a transmitting antenna may be located on a first plane and a receiving antenna may be located on a second plane, and the first plane and second plane may be distinct planes that are not parallel or perpendicular to each other.

Figure 2B:
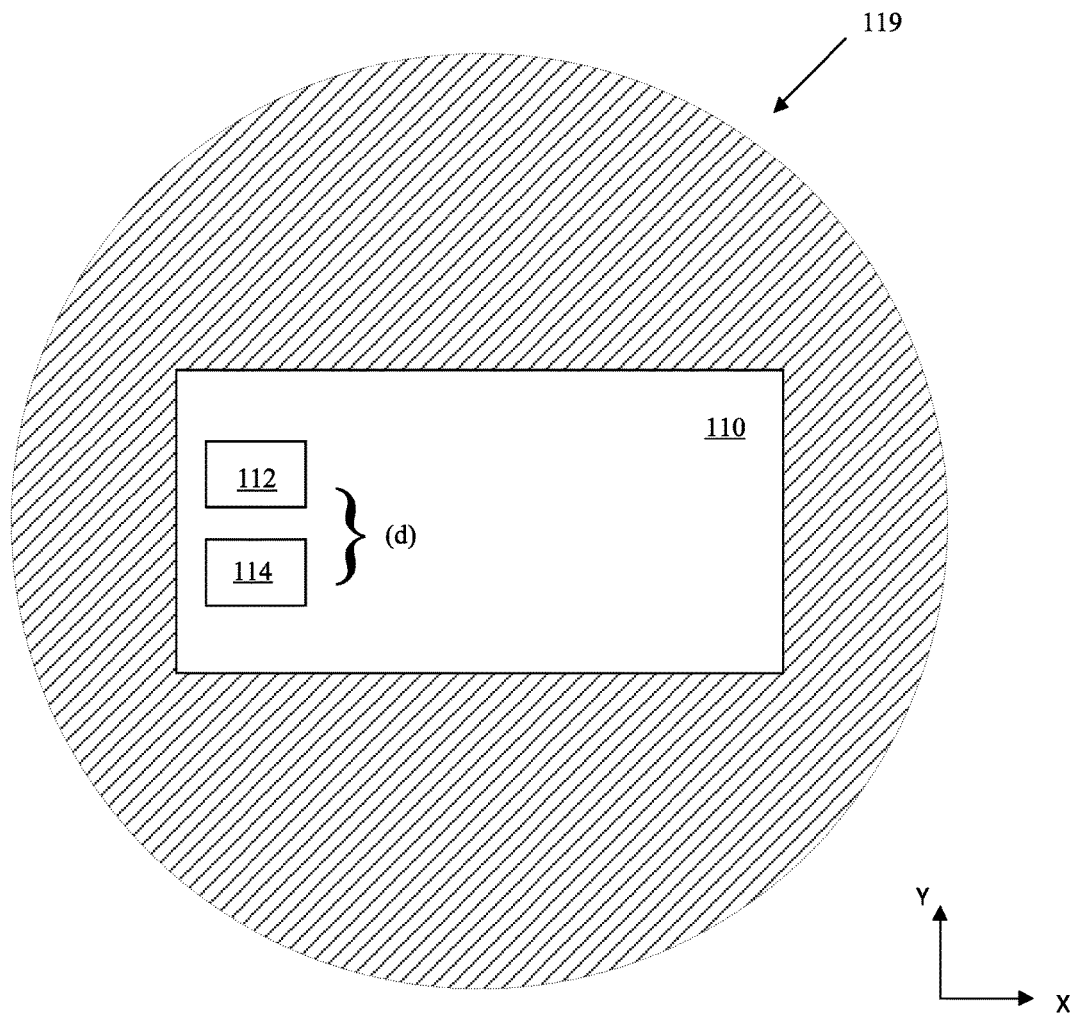
FIG. 2B illustrates a radar antenna array with a spatial configuration and a field of detection, in accordance with some embodiments.

As illustrated in FIG. 2B, the spatial configuration of a radar antenna array 110 may also involve a relative fixed distance d between the transmitting antenna 112 and the receiving antenna 114. The relative fixed distance may be 1 mm, 2 mm, 3 mm, 4 mm, 5 mm, 6 mm, 7 mm, 8 mm, 9 mm, 10 mm, 10 cm, 100 cm, 1 m, or any value between 1 mm and 1 m. The relative fixed distance may have a tolerance based on a pre-defined threshold value. The threshold value may be associated with a percentage of a wavelength of a transmitted radar pulse or a percentage of a fraction of a wavelength of a transmitted radar pulse. A fraction of a wavelength of a transmitted radar pulse may be less than or equal to about 1, 0.75, 0.67, 0.5, 0.33, 0.25, 0.2, or 0.1 of the wavelength of a transmitted radar pulse. In some cases, a fraction of the wavelength of a transmitted radar pulse may be greater than 1. For example, a fraction of the wavelength of a transmitted radar pulse may be at least about 1.25, 1.5, 1.75, 2, 3, 4, 5, 6, 7, 8, 9, or 10 times the wavelength of a transmitted radar pulse. The radar antenna array may also have a field of detection 119. The field of detection may comprise an imaging region as described elsewhere herein. An imaging region may be a subset of the region encompassed by the field of detection of the radar antenna array. In some cases, the spatial configuration of the radar antenna array may be based at least in part on the imaging region as described in more detail later in this specification.

The fixed spatial configuration may be substantially maintained by rigidly mounting one or transmitting and/or receiving antennas to a support structure. The support structure may keep the transmitting and receiving antennas at fixed positions relative to one another. Movement of the vehicle may cause less than a 5 degree, 3 degree, 2 degree, 1 degree, 0.5 degree or 0.1 degree variance in the angles relative to one another and/or relative to the environment. Such movement of less than the degrees provided may constitute the transmitting and/or receiving antennas being substantially fixed. The support structure may be formed from a substantially rigid material. In some alternative embodiments, the transmitting and receiving antennas may move relative to one another. During operation of the vehicle, the transmitting and receiving antennas may move relative to the vehicle body. The support structure may comprise one or more hinges, ball joints, tracks, slides, grooves, or other mechanisms that may allow the transmitting and receiving antennas to move relative to one another. The support structure may comprise one or more actuator that may cause the transmitting and receiving antennas to move relative to one another. In some embodiments, the transmitting and receiving antennas may be supported by a carrier on the support structure. The carrier may be gimbal as described elsewhere herein. The carrier may comprise a one-axis gimbal, two-axis gimbal, or three-axis gimbal. The transmitting and receiving antennas may rotate about a yaw, pitch, and/or roll axis relative to the support structure. In some embodiments, at some moment in time, the carrier may hold the transmitting and receiving antennas at fixed positions relative to one another, the support structure, and/or the vehicle. In some embodiments, the carrier may permit movement about one, two, or more degrees of freedom relative to the support structure, vehicle, or inertial reference frame, to maintain a fixed disposition between the transmitting and receiving antennas. The transmitting and receiving antennas may rotate about the same amount in the same direction. In some instances, the fixed disposition may be maintained with aid of one or more linkages. The linkages may comprise serial or parallel linkages. The linkages may be multi-bar linkages. The fixed disposition may be maintained with aid of a kinematic coupling. The fixed disposition may be maintained by mechanically coupling the transmitting and receiving antennas units in a rigid manner. The disposition of the transmitting and receiving antennas may be controlled in real-time. The disposition of the transmitting and receiving antennas may be controlled during operation of the vehicle.

The transmitting and receiving antennas may be held within a recess or sleeve of the common support. The transmitting and receiving antennas may be attached with aid of brackets, or other types of fasteners, to the common support. The transmitting and receiving antennas may be completely or partially embedded in the common support. The transmitting and receiving antennas on a common support may be located close to one another. In some embodiments, there may be a distance of less than 30 cm, 20 cm, 15 cm, 10 cm, 7 cm, 5 cm, 3 cm, 2 cm, 1 cm, 0.5 cm, or 0.1 cm between adjacent transmitting and/or receiving antennas. The transmitting and receiving antennas may be supported by the support structure. The weight of the transmitting and receiving antennas may be borne by the support structure.

In some embodiments, the support structure may be built into a chassis of the vehicle or integrated into a chassis of the vehicle. The chassis of the vehicle may include an internal frame of the vehicle or a body panel of the vehicle. In some cases, a portion of the vehicle chassis may comprise a material that may enhance a radar signal. A radar signal may be enhanced if the strength of the signal is increased relative to the noise of the signal.

The support structure may be able to decouple the one or more transmitting and/or receiving antennas from vibrations, shocks, or impacts experienced by a vehicle in motion. In some embodiments, the fixed spatial configuration may also be modified or controlled by a mechanism configured to adjust and/or calibrate the alignment or location of one or more transmitting and/or receiving antennas. The mechanism may be an open loop control system, a closed loop control system, a feedback loop system, a feedforward loop system, or any combination thereof.

In some embodiments, the system may be a SAR system or a SAR-based system as described elsewhere herein. The SAR system may include a radar antenna array. The radar antenna array may have a virtual antenna. A virtual antenna may be an antenna and/or an antenna array that is simulated by a Synthetic Aperture Radar (SAR) system (or a SAR-based system). A SAR system may operate similarly to a phased array radar system, but instead of many parallel antenna elements, a single antenna may be used to combine multiple raw radar returns from different geometric positions of a terrestrial vehicle into coherent focused images. A SAR system can provide high resolution radar imagery from a moving terrestrial platform or terrestrial vehicle in part by using the motion path of the platform or vehicle to simulate a large antenna or aperture electronically and/or virtually. In some embodiments, the virtual antenna may be an antenna and/or an antenna array that is simulated by a multiple-input-multiple-output (MIMO) radar system (or a MIMO-based system). A MIMO radar system may use multiple transmitting antennas to transmit signals independently of other transmitting antennas, and multiple receiving antennas to receive signals independently of other receiving antennas. A MIMO radar system may use multiple transmitting antennas M and multiple receiving antennas N to simulate a virtual array of M×N transmitting and/or receiving antennas. In other embodiments, a virtual antenna may be an antenna and/or an antenna array that is simulated by a SAR-based system, a MIMO-based system, or any system that includes one or more features of a SAR-based system and/or a MIMO-based system.

Figure 3A:
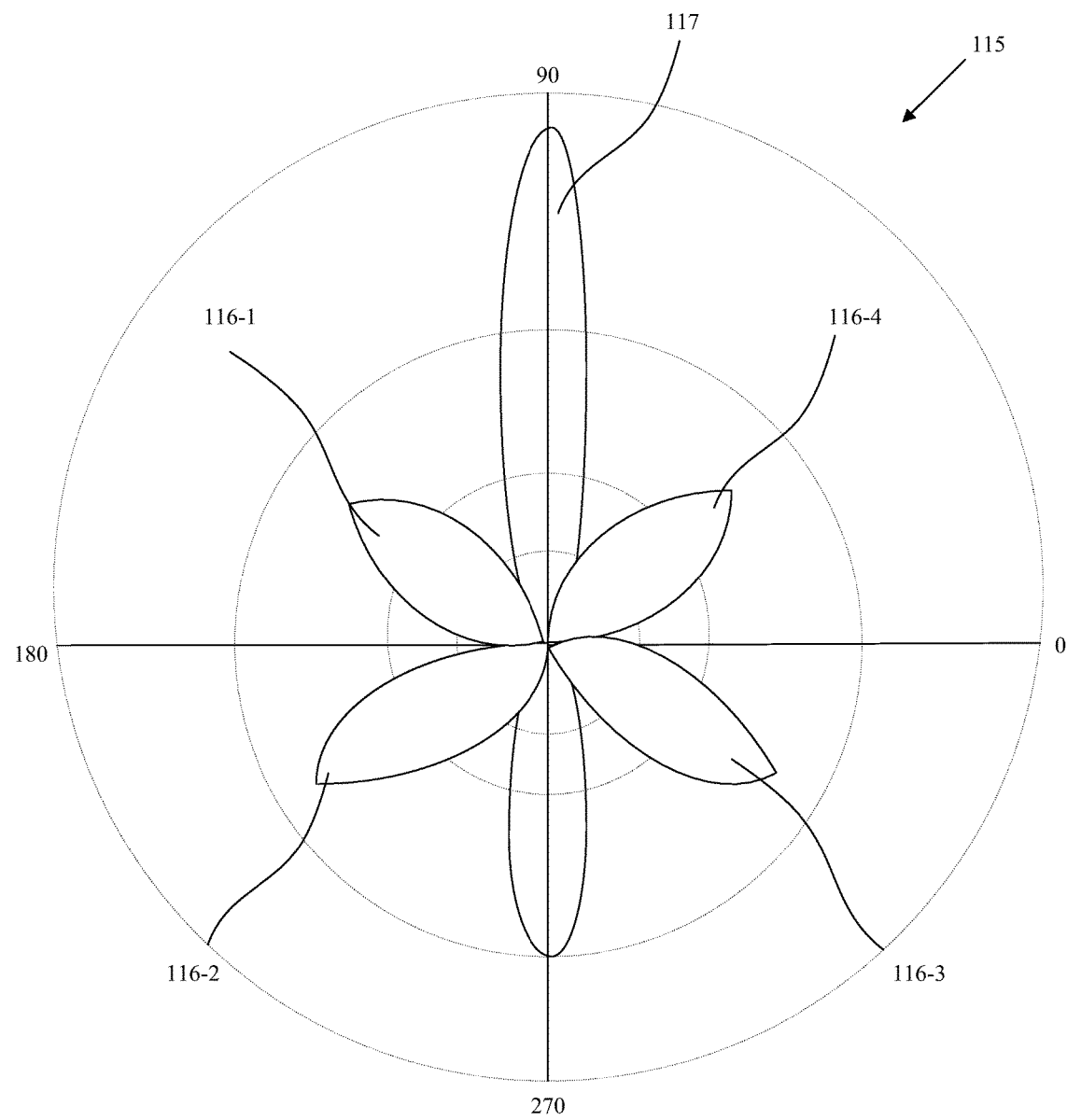
FIG. 3A illustrates an effective sensitivity pattern of a radar antenna array, in accordance with some embodiments.

As illustrated in FIG. 3A, the radar antenna array may have an effective sensitivity pattern 115 associated with the radar antenna array. The effective sensitivity pattern may be a radiation pattern of the radar antenna array. A radiation pattern may be a pattern showing the directivity or gain of a radar antenna array as a function of azimuth and/or elevation angle. The directivity or gain of a radar antenna array may be determined in part by a ratio between the radiation intensity of the radar antenna array and the radiation intensity of an isotropic antenna. An isotropic antenna may be an antenna that is capable of radiating or receiving energy uniformly in all directions. The radiation intensity may be a function of power radiated or received by the radar antenna array per unit solid angle. A solid angle may be a unit of area corresponding to a portion of the surface area of a sphere. A radiation pattern may include one or more lobes. A lobe may be a region within the radiation pattern where the directivity or gain of the antenna attains a local maximum value. A lobe may be oriented in any direction ranging from 0 degrees to 360 degrees in azimuth angle and/or elevation angle relative to a pre-defined orientation of the radar antenna array. The pre-defined orientation of the radar antenna array may be defined by an azimuth and/or elevation angle ranging from 0 degrees to 360 degrees relative to the path of motion of the terrestrial vehicle.

As illustrated in FIG. 3A, the effective sensitivity pattern 115 may include one or more side lobes 116-1, 116-2, 116-3, 116-4 and a main lobe 117. A main lobe may be a lobe within the radiation pattern with the largest directivity or gain relative to other lobes in the radiation pattern. A main lobe may indicate the presence of a target in a direction that the main lobe is oriented. A side lobe may be any lobe that is not a main lobe. A side lobe may represent a region of unwanted or unintended radiation. The side lobe may be an aliasing side lobe. An aliasing side lobe may be a side lobe with a directivity or gain that approaches the magnitude of the directivity or gain of a main lobe due to aliasing effects during signal sampling. Aliasing effects may be distortions or artifacts created when a signal is reconstructed from sample signals. Aliasing may include spatial aliasing and/or temporal aliasing. Spatial aliasing may include the degradation of image shapes, definitions, and/or details that occurs due to limited spatial resolution. Temporal aliasing may include strobing or flickering effects that occur in an image due to limited temporal resolution.

Figure 3B:
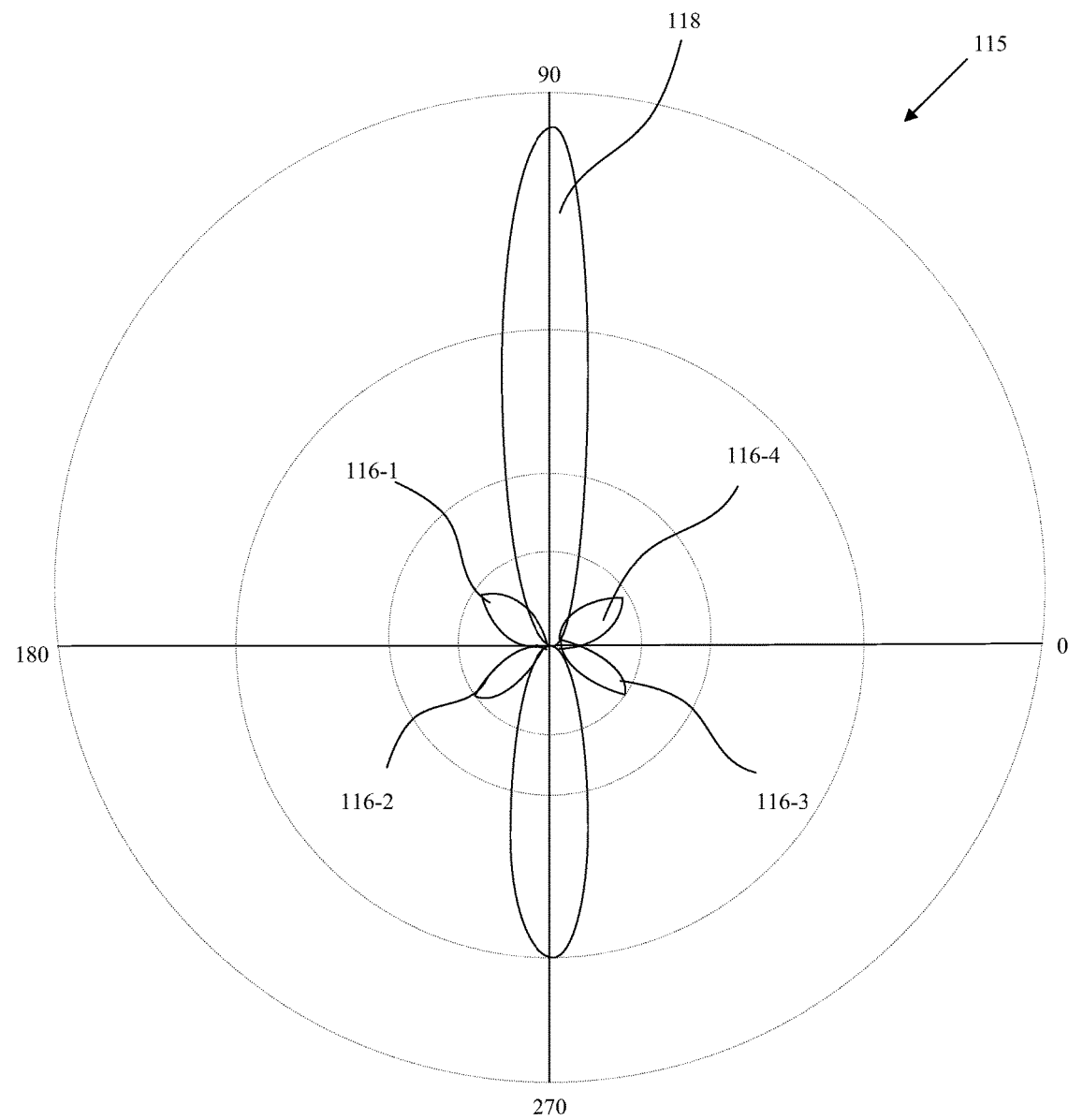
FIG. 3B illustrates an effective sensitivity pattern with an enhanced main lobe, in accordance with some embodiments.

Referring back to FIG. 1B, one or more controllers 130-1, 130-2, 130-3 may be operatively coupled to a radar antenna arrays 110. The one or more controllers may be configured to use a spatial configuration of the radar antenna array and spatial information of a terrestrial vehicle while the vehicle is in motion to generate an enhanced main lobe. Spatial information of a terrestrial vehicle may include information about the position, velocity, acceleration, and other kinematic properties of the terrestrial vehicle relative to external targets, a surrounding environment, a radar antenna array, or any other static or moving point of reference. As illustrated in FIG. 3B, an enhanced main lobe 118 may be a main lobe that has increased in magnitude with respect to one or more side lobes 116-1, 116-2, 116-3, 116-4. An enhanced main lobe may indicate the presence of a target in a direction that the enhanced main lobe is oriented. The enhanced main lobe may be generated by attenuating one or more side lobes relative to the main lobe, or by enhancing the main lobe relative to one or more side lobes. Attenuation of one or more side lobes may be achieved by the use of a SAR imaging algorithm. The SAR imaging algorithm may be an image formation algorithm. An image formation algorithm may be an algorithm that can create two-dimensional (2D) or three-dimensional (3D) images of one or more targets using a plurality of signals received by the radar antenna array. The plurality of signals may contain data such as phase measurements at one or more transmitting and/or receiving antennas in a radar antenna array. An image formation algorithm may be a time domain algorithm and/or a frequency domain algorithm. A time domain algorithm may be an algorithm that constructs an image of one or more targets by performing calculations with respect to the samples in time of the plurality of signals transmitted and/or received by the radar antenna array. A frequency domain algorithm may be an algorithm that constructs an image of one or more targets by performing calculations with respect to a Fourier transform of the samples in time of the plurality of signals transmitted and/or received by the radar antenna array. Time domain algorithms may include one or more features of a global back projection algorithm, a fast back projection algorithm, a fast factorized back projection algorithm, and/or a local back projection algorithm. Time domain algorithms may use a matched filtering process to correlate one or more radar pulses transmitted by the radar antenna array and/or transmitting antenna with one or more signals received by the radar antenna array and/or receiving antenna. Frequency domain algorithms may include one or more features of a Fourier-domain reconstruction algorithm, chirp scaling algorithm, range migration algorithm, polar format algorithm, Omega-K algorithm, and/or a Range-Doppler algorithm. The one or more controllers may be further configured to use the enhanced main lobe to determine the spatial dispositions or characteristics of one or more targets.

Referring back to FIG. 2B, the radar antenna array 110 may have a field of detection 119 as previously described elsewhere herein. A field of detection may include a region relative to the radar antenna array where the radar antenna array may collect data. The field of detection may include a distance, range, and/or a direction. For example, the field of detection may include a maximum distance and/or minimum distance that can be detected by the radar antenna array. The minimum distance may be zero. The maximum distance may or may not be affected by environmental conditions (e.g., temperature, particulates in the air, precipitation, air pressure, noise, etc.). A direction may include an angle range. For instance, a radar antenna array may have an angular range field of view. The radar antenna array may not be capable of collecting data outside the field of detection. Areas outside the field of detection of a radar antenna array may be a blind spot of the radar antenna array and/or system.

Although various fields of detection are illustrated with various shapes, it may be understood that the field of detection may have any shape. For example, the field of detection may have a substantially circular shape. The vehicle may be located at the center of the circle or another part of the circle. The field of detection may have a substantially ellipsoidal or oval shape. The field of detection may have a substantially sector or wedge shape. The field of detection may have a substantially triangular shape, quadrilateral shape (e.g., rectangular shape, square shape, diamond shape, trapezoidal shape), pentagonal shape, hexagonal shape, octagonal shape, or any other shape. Any of the shapes described herein may represent a cross-section of the field of detection. In some embodiments, the shapes may be a lateral cross-sectional shape, or a vertical cross-sectional shape. The field of detection may form a spherical, semispherical, conical, cylindrical, prismatic, toroidal, or any other type of shape. In some embodiments, the field of detection may comprise a combination or a plurality of any of the shapes described, to collectively form a new shape. The field of detection may be formed of a single continuous shape or multiple discontinuous shapes.

The field of detection may collectively reach around at least 360 degrees surrounding the vehicle. In some instances, the field of detection may be at least about 15 degrees, 30 degrees, 45 degrees, 60 degrees, 75 degrees, 90 degrees, 120 degrees, 150 degrees, 180 degrees, 210 degrees, 240 degrees, 270 degrees, 300 degrees, or 330 degrees around the vehicle. The field of detection may have angular values less than any of the values described herein, or falling within a range between any two of the values described herein. The angle ranges may be provided relative to a lateral direction around the vehicle, or vertical direction around the vehicle. In some embodiments, the field of detection may be evenly distributed around the vehicle. In some cases, the field of detection may correspond to the effective sensitivity pattern associated with the radar antenna array.

In some embodiments, the spatial configuration of the radar antenna array may be based at least in part on an imaging region and an angular resolution within a field of detection of the radar antenna array. An imaging region may be a subset of the region encompassed by the field of detection of the radar antenna array. The imaging region may include a region within the field of detection of the radar antenna array that is defined by a range of azimuth angles and/or a range of elevation angles. The imaging region may be a pre-defined design parameter. The imaging region may be centered on the vehicle's direction of motion. In some cases, the imaging region may be defined separately for azimuth angle ranges and elevation angle ranges. The imaging region may cover less than ±10 degrees from a forward or reverse direction of motion of a terrestrial vehicle. The imaging region may cover at least ±10 degrees from a forward or reverse direction of motion of a terrestrial vehicle. In other cases, the imaging region may cover no more than ±60 degrees from a forward or reverse direction of motion of a terrestrial vehicle. Alternatively, the imaging region may cover more than ±60 degrees from a forward or reverse direction of motion of a terrestrial vehicle. The imaging region may cover the field of detection.

In some embodiments, the radar antenna array may comprise a radar system used on a vehicle in motion. The radar system may be a SAR system, a SAR-based system, a MIMO system, a MIMO-based system, or any other radar system as described elsewhere herein. The vehicle in motion may move a pre-defined distance L over a pre-defined time period T.

The radar antenna array may have an operating wavelength $\lambda$. The operating wavelength may be equivalent to the wavelength associated with the center frequency $f_0$ of the successive radar pulses transmitted by the radar antenna array and/or one or more transmitting antennas comprising the radar antenna array.

The radar antenna array may have an angular resolution. The angular resolution may be an azimuth resolution or an elevation resolution, or any combination thereof. Azimuth resolution may be the ability of a radar system to distinguish between two or more targets at similar range but different bearings. Elevation resolution may be the ability of a radar system to distinguish between two or more targets at similar range but different elevation. Azimuth and elevation resolution may be a function of radar antenna array geometry. The angular resolution of the radar antenna array may be given by:

$$\theta = 2\sqrt{\frac{\lambda}{2L}}$$

where $\theta$ is the angular resolution of the radar antenna array, $\lambda$ is an operating wavelength of the radar antenna array, and L is a pre-defined distance parameter corresponding to a distance traveled by a vehicle. L may be the distance traveled by a vehicle over a period of time T. T may be a pre-defined time period. L and T may be design parameters chosen based on the accuracy of a radar antenna array and/or the accuracy of a vehicle position sensor. In some cases, the one or more controllers of the system may be further configured to use the angular resolution of the radar antenna array and the operating wavelength of the radar antenna array at least in part to define a distance traveled by a terrestrial vehicle.

The radar system may be configured to combine a plurality of signals received by the radar antenna array over a time period T to provide an effective aperture of the radar antenna array. The effective aperture may be proportional to $\sqrt{L}$. The aperture size may be 1 mm, 2 mm, 3 mm, 4 mm, 5 mm, 6 mm, 7 mm, 8 mm, 9 mm, 10 mm, 10 cm, 100 cm, 1 m, or any value between 1 mm and 1 m.

The radar antenna array may have an aperture size. In some embodiments, the aperture size may be based at least in part on the angular resolution of the radar antenna array and the operating wavelength of the radar antenna array. The relationship between aperture size, angular resolution, and operating wavelength may be given by:

$$\theta = c * \frac{\lambda}{A}$$

where $\theta$ is the angular resolution of the radar antenna array, c is a proportionality constant, $\lambda$ is an operating wavelength of the radar antenna array, and A is the aperture size of the radar antenna array.

Figure 4:
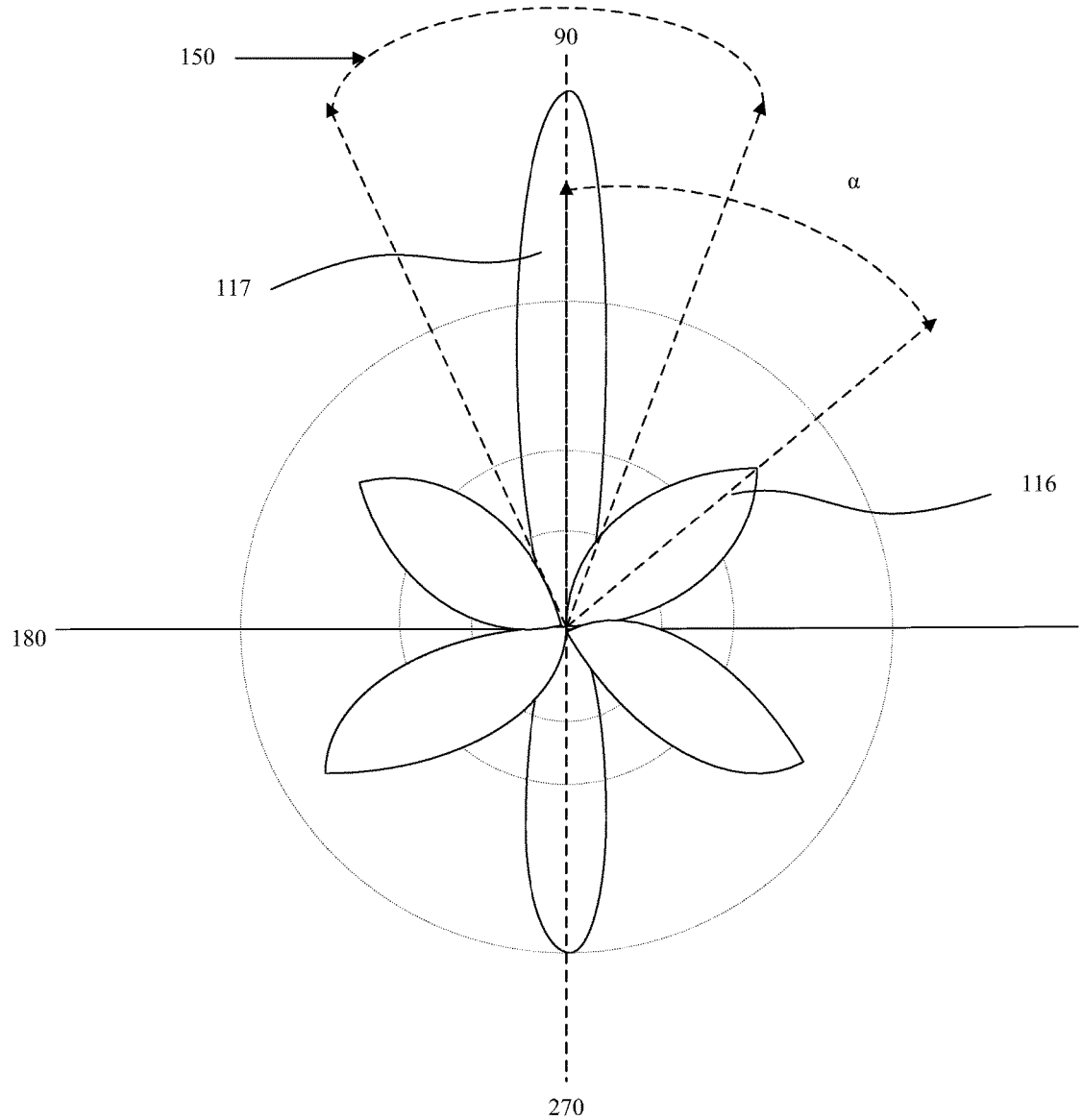
FIG. 4 illustrates an effective sensitivity pattern with an angular distance between a main lobe and a side lobe, in accordance with some embodiments.

As shown in FIG. 4, in some embodiments, the one or more sidelobes 116 may be located at an angular distance a from the main lobe 117. The angular distance may range from 0 degrees to 360 degrees. In other embodiments, the spatial configuration of the radar antenna array may further include a spacing between adjacent transmitting and/or receiving antennas of the radar antenna array. The spacing may be a relative fixed distance as described elsewhere herein. In some cases, the spatial configuration of the radar antenna array and/or the spacing between adjacent transmitting and/or receiving antennas may allow the angular distance a between one or more sidelobes 116 and a main lobe 117 to be greater than the range of azimuth and/or elevation angles defining an imaging region 150. In some cases, the spacing between adjacent transmitting and/or receiving antennas may allow the one or more side lobes to lie outside of the range of azimuth and/or elevation angles defining an imaging region. In any one or more of the embodiments described herein, the spacing between adjacent transmitting and/or receiving antennas may be at least 10% greater than one-half of the operating wavelength of the radar antenna array. In any of the embodiments described herein, the spacing between adjacent transmitting and/or receiving antennas may be greater than about 2 mm.

Referring back to FIG. 1B, one or more controllers 130-1, 130-2, 130-3 may be operatively coupled to a radar antenna arrays 110. The one or more controllers may be configured to use spatial information of a terrestrial vehicle and a spatial configuration of the radar antenna array to provide an enhanced main lobe. The one or more controllers may provide an enhanced main lobe by attenuating one or more side lobes relative to a main lobe, or by enhancing a main lobe relative to one or more side lobes. Spatial information of a terrestrial vehicle may include a distance traveled by the terrestrial vehicle. The spatial configuration of the radar antenna array may include a spacing between adjacent transmitting and/or receiving antennas as described elsewhere herein. In some embodiments, the spatial configuration of the radar antenna arrays may include a spacing between adjacent transmitting and/or receiving antennas in a radar antenna array. In some cases, the spacing may be greater than one-half of an operating wavelength of a radar antenna array.

Referring back to FIG. 2A, a radar antenna array may be configured to transmit successive radar pulses 105 at a pulse repetition frequency as described elsewhere herein. In some embodiments, when the vehicle is in motion, the distance traveled by the terrestrial vehicle between two successive radar pulses may be a fraction of an operating wavelength of the radar antenna array. A fraction of the operating wavelength may be less than or equal to about 1, 0.75, 0.67, 0.5, 0.33, 0.25, 0.2, or 0.1 of the operating wavelength. In some cases, a fraction of the operating wavelength described herein may be greater than 1. For example, a fraction of the operating wavelength may be at least about 1.25, 1.5, 1.75, 2, 3, 4, 5, 6, 7, 8, 9, or 10 times the operating wavelength. In some cases, the distance traveled by the terrestrial vehicle between two successive radar pulses may be less than about one-half of the operating wavelength of the radar antenna array.

Figure 5:
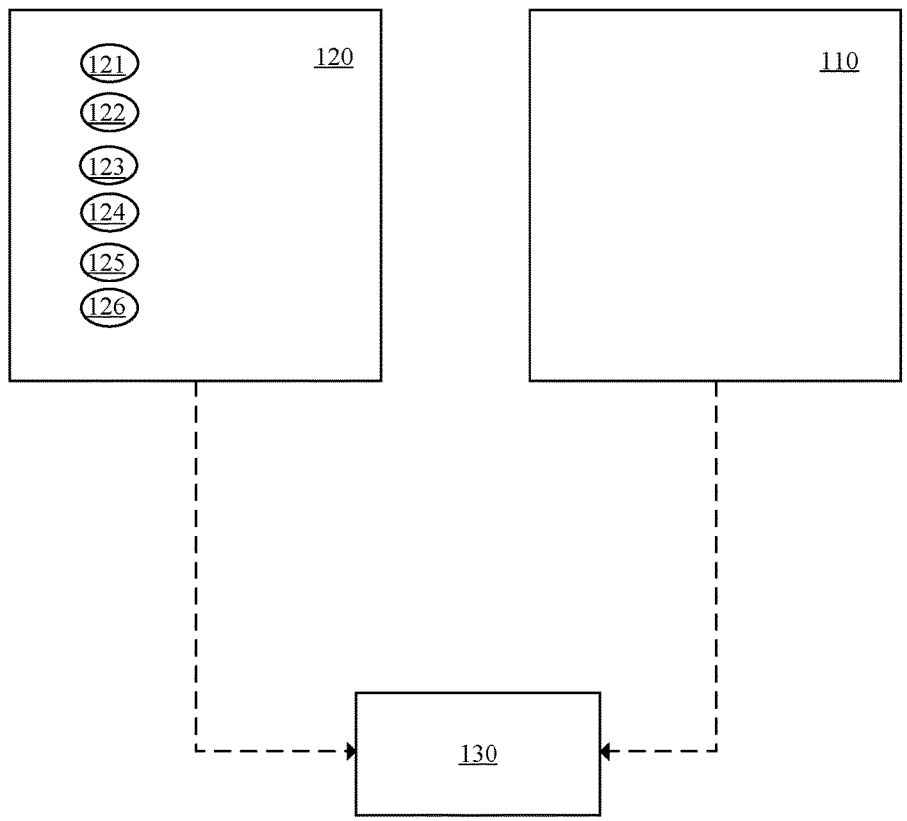
FIG. 5 illustrates a controller operatively coupled to a radar antenna array and a vehicle position sensor, in accordance with some embodiments.

FIG. 5 shows a controller 130 operatively coupled to a radar antenna array 110 and a vehicle position sensor 120. In some embodiments, one or more controllers may be configured to obtain position information of a terrestrial vehicle using a vehicle position sensor. A vehicle position sensor may include any sensor that can obtain the spatial disposition of a terrestrial vehicle. In some embodiments, the vehicle position sensor may include a global positioning system (GPS) sensor 121, an inertial measurement unit (IMU) 122, a camera 123, a LIDAR 124, a radar 125, a wheel encoder 126, or any other sensor that may be used to monitor the position of a moving object. Position sensors may include location sensors (e.g., global positioning system (GPS) sensors, mobile device transmitters enabling location triangulation), vision sensors (e.g., imaging devices capable of detecting visible, infrared, or ultraviolet light, such as cameras), proximity or range sensors (e.g., ultrasonic sensors, lidar, time-of-flight or depth cameras), inertial sensors (e.g., accelerometers, gyroscopes, inertial measurement units (IMUs)), altitude sensors, attitude sensors (e.g., compasses), pressure sensors (e.g., barometers), audio sensors (e.g., microphones) or field sensors (e.g., magnetometers, electromagnetic sensors). In some embodiments, the vehicle position sensor may be located onboard the terrestrial vehicle and situated separately from the radar antenna array. In some cases, the vehicle position sensor may be configured to be mounted to a front side, rear side, or lateral side of a terrestrial vehicle. The vehicle position sensor may be mounted to any side of the vehicle, or to one or more sides of the vehicle, e.g. a front side, rear side, lateral side, top side, and/or bottom side of the vehicle. In some cases, the vehicle position sensor may be mounted between two or more adjacent sides of the vehicle.

Figure 6:
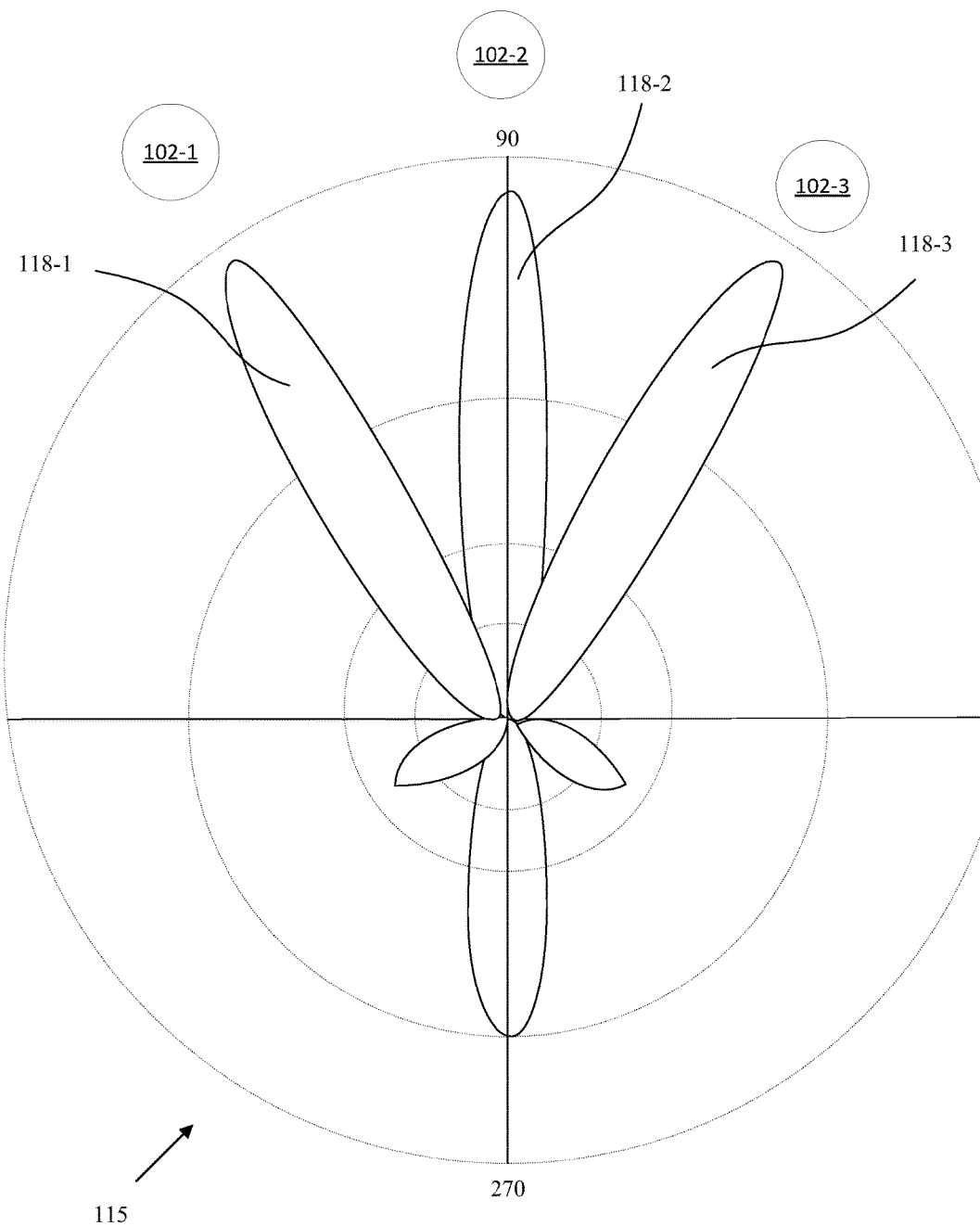
FIG. 6 illustrates an effective sensitivity pattern with one or more enhanced main lobes, in accordance with some embodiments.

In any of the embodiments described herein, the controller may be configured to determine spatial dispositions or characteristics of one or more targets. The controller may determine the spatial dispositions or characteristics of one or more targets by providing one or more enhanced main lobes. The controller may be configured to provide one or more enhanced main lobes by attenuating one or more side lobes and/or enhancing one or more main lobes. As shown in FIG. 6, the one or more enhanced main lobes 118-1, 118-2, 118-3 in an effective sensitivity pattern 115 may be associated with the one or more targets 102-1, 102-2, 102-3. In any one or more of the embodiments described herein, the controller may be further configured to differentiate between the spatial disposition and/or characteristics of the one or more targets after attenuating one or more side lobes and/or enhancing one or more main lobes. Differentiating between the spatial dispositions or characteristics of the one or more targets may involve associating and/or correlating one or more spatial dispositions or characteristics with one or more distinct targets.

Various methods for identifying a position of a target are described herein. The methods may be implemented using any one or more systems described elsewhere herein. In some embodiments, the system may be configured to perform a method for identifying a position of a target. The method may comprise collecting radar data from an environment external to a terrestrial vehicle using a radar antenna array and collecting position information of a terrestrial vehicle. The radar data may include a main lobe and/or one or more sidelobes. The position information of a terrestrial vehicle may be collected using a vehicle position sensor. The one or more sidelobes may be an aliasing sidelobe. The method may further comprise using at least the position information to generate an enhanced main lobe. The enhanced main lobe may be generated by attenuating the one or more side lobes or by enhancing the main lobe relative to the one or more side lobes. The method may further comprise using the enhanced main lobe to identify a position of one or more targets in an external environment with an accuracy of at least 90%. In some cases, the target may have a cross-sectional size of at least 0.2 meters. In some cases, the target may be located a distance of at least 1 meter from any one or more sides of a terrestrial vehicle. In some embodiments, the radar antenna array may be provided on a front side of a terrestrial vehicle in a forward-facing direction of the terrestrial vehicle. In other embodiments, the radar antenna array may be provided on a rear side of a terrestrial vehicle in a reverse-facing direction of the terrestrial vehicle.

In some embodiments, the system may be configured to perform a method for determining a spatial disposition or a characteristic of a target. The method may comprise providing a radar antenna array on a terrestrial vehicle. The radar antenna array may be configured to be mounted to a front side, rear side, or lateral side of a terrestrial vehicle. The radar antenna array may be mounted to any side of the vehicle, or to one or more sides of the vehicle, e.g. a front side, rear side, lateral side, top side, and/or bottom side of the vehicle. In some cases, the radar antenna array may be mounted between two or more adjacent sides of the vehicle. The method may further comprise transmitting successive radar pulses and receiving a plurality of signals corresponding to at least a subset of the successive radar pulses with the aid of the radar antenna array. The plurality of signals may be generated upon the at least a subset of the successive radar pulses interacting with the target. An effective sensitivity pattern associated with the radar antenna array may be obtainable from the plurality of signals. The effective sensitivity pattern may comprise a main lobe and one or more side lobes. The one or more side lobes may comprise an aliasing side lobe. The method may further comprise using position information of the terrestrial vehicle while the vehicle is in motion and a spatial configuration of the radar antenna array to provide an enhanced main lobe. An enhanced main lobe may be provided by attenuating the side lobe relative to the main lobe and/or enhancing the main lobe relative to the side lobe. Attenuation of one or more side lobes may be achieved by the use of a SAR imaging algorithm. The SAR imaging algorithm may be an image formation algorithm as described elsewhere herein. The method may further comprise using the enhanced main lobe to determine the spatial dispositions or characteristics of one or more targets. In some embodiments, the spatial disposition or characteristic of the target may be determined substantially in real time while the terrestrial vehicle is in motion relative to the target. In some embodiments, the radar antenna array may be mounted on the terrestrial vehicle in a forward-facing direction or in a rear-facing direction relative to the direction of motion of the terrestrial vehicle. In some cases, the spatial configuration of the radar antenna array may comprise a spacing between adjacent transmitting and/or receiving antennas of the radar antenna array as described elsewhere herein. The spacing may be greater than one-half of an operating wavelength of the radar antenna array. In some embodiments, the method may further comprise determining a spatial disposition or characteristic of a plurality of targets. The spatial disposition or characteristic of a plurality of targets may be determined by attenuating one or more side lobes in the effective sensitivity pattern or by enhancing one or more main lobes in the effective sensitivity pattern to provide a plurality of enhanced main lobes. The plurality of targets may comprise the target. In some embodiments, the method may further comprise differentiating between the spatial dispositions or characteristics of the plurality of targets after the plurality of side lobes have been attenuated or the plurality of main lobes have been enhanced. Differentiating between the spatial dispositions or characteristics of the plurality of targets may involve associating and/or correlating one or more spatial dispositions or characteristics with one or more distinct targets.

Figure 7:
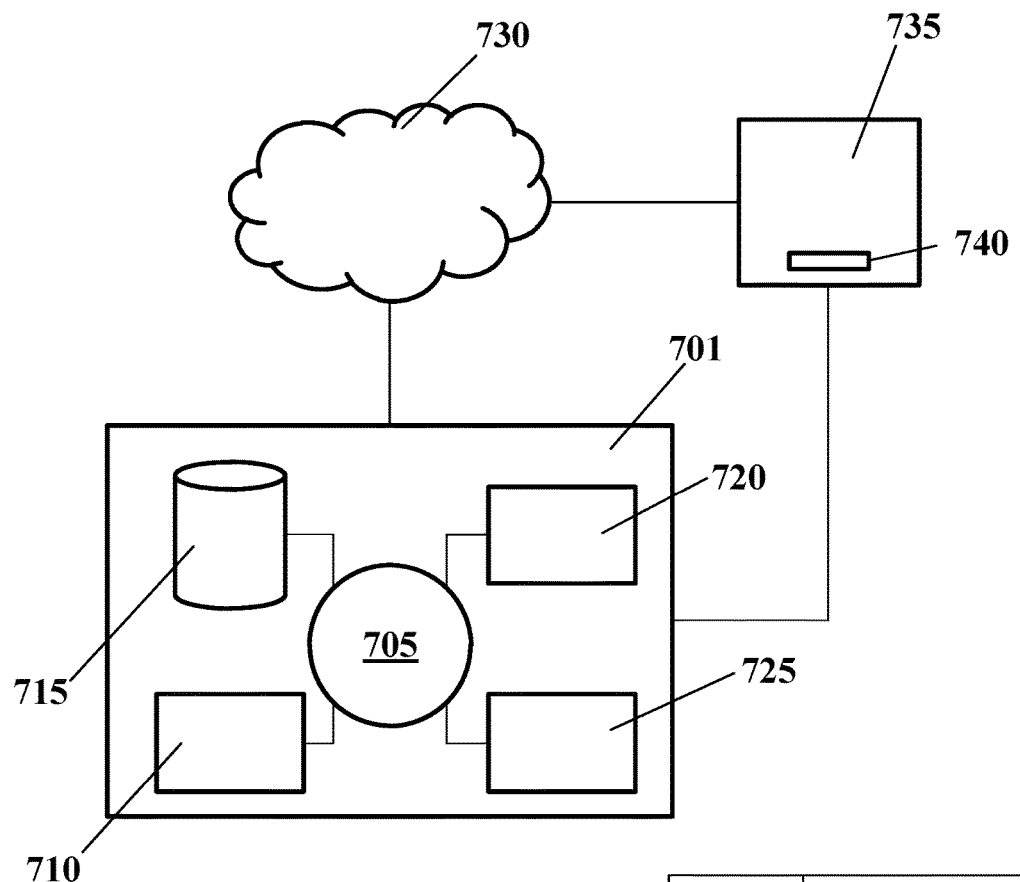
FIG. 7 illustrates a computer control system that is programmed or otherwise configured to implement methods provided herein.

Computer control systems are provided herein that can be used to implement methods or systems of the disclosure. FIG. 7 shows a computer system 701 that is programmed or otherwise configured to implement a method for determining a spatial disposition or characteristic of one or more targets external to a vehicle. The computer system 701 can be configured to use spatial information of a terrestrial vehicle while the vehicle is in motion and a spatial configuration of a radar antenna array to generate an enhanced main lobe. The computer system 701 may generate an enhanced main lobe by enhancing a main lobe in an effective sensitivity pattern associated with the radar antenna array or attenuating one or more side lobes in an effective sensitivity pattern associated with the radar antenna array. The computer system 701 may use the enhanced main lobe to determine a spatial disposition or characteristic of one or more targets external to a vehicle. The computer system 701 can be an electronic device of a user or a computer system that is remotely located with respect to the electronic device. The electronic device can be a mobile electronic device.

The computer system 701 includes a central processing unit (CPU, also "processor" and "computer processor" herein) 705, which can be a single core or multi core processor, or a plurality of processors for parallel processing. The computer system 701 also includes memory or memory location 710 (e.g., random-access memory, read-only memory, flash memory), electronic storage unit 715 (e.g., hard disk), communication interface 720 (e.g., network adapter) for communicating with one or more other systems, and peripheral devices 725, such as cache, other memory, data storage and/or electronic display adapters. The memory 710, storage unit 715, interface 720 and peripheral devices 725 are in communication with the CPU 705 through a communication bus (solid lines), such as a motherboard. The storage unit 715 can be a data storage unit (or data repository) for storing data. The computer system 701 can be operatively coupled to a computer network ("network") 730 with the aid of the communication interface 720. The network 730 can be the Internet, an internet and/or extranet, or an intranet and/or extranet that is in communication with the Internet. The network 730 in some cases is a telecommunication and/or data network. The network 730 can include one or more computer servers, which can enable distributed computing, such as cloud computing. The network 730, in some cases with the aid of the computer system 701, can implement a peer-to-peer network, which may enable devices coupled to the computer system 701 to behave as a client or a server.

The CPU 705 can execute a sequence of machine-readable instructions, which can be embodied in a program or software. The instructions may be stored in a memory location, such as the memory 710. The instructions can be directed to the CPU 705, which can subsequently program or otherwise configure the CPU 705 to implement methods of the present disclosure. Examples of operations performed by the CPU 705 can include fetch, decode, execute, and writeback.

The CPU 705 can be part of a circuit, such as an integrated circuit. One or more other components of the system 701 can be included in the circuit. In some cases, the circuit is an application specific integrated circuit (ASIC).

The storage unit 715 can store files, such as drivers, libraries and saved programs. The storage unit 715 can store user data, e.g., user preferences and user programs. The computer system 701 in some cases can include one or more additional data storage units that are external to the computer system 701, such as located on a remote server that is in communication with the computer system 701 through an intranet or the Internet.

The computer system 701 can communicate with one or more remote computer systems through the network 730. For instance, the computer system 701 can communicate with a remote computer system of a user (e.g., an end user, a vehicle operator, a vehicle passenger, a vehicle manufacturer, etc.). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 701 via the network 730.

Methods as described herein can be implemented by way of machine (e.g., computer processor) executable code stored on an electronic storage location of the computer system 701, such as, for example, on the memory 710 or electronic storage unit 715. The machine executable or machine readable code can be provided in the form of software. During use, the code can be executed by the processor 705. In some cases, the code can be retrieved from the storage unit 715 and stored on the memory 710 for ready access by the processor 705. In some situations, the electronic storage unit 715 can be precluded, and machine-executable instructions are stored on memory 710.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 701, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 701 can include or be in communication with an electronic display 735 that comprises a user interface (UI) 740 for providing, for example, a portal for monitoring one or more targets detected by the system. A user can use the portal to view information relating to the spatial disposition or characteristics of one or more targets detected by the system. The portal may be provided through an application programming interface (API). A user or entity can also interact with various elements in the portal via the UI. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 705. The algorithm may be configured to obtain spatial information of a terrestrial vehicle. The algorithm may be further configured to use the spatial information of a terrestrial vehicle and a spatial configuration of a radar antenna array to generate an enhanced main lobe. The enhanced main lobe may be generated by attenuating one or more side lobes in an effective sensitivity pattern associated with the radar antenna array relative to a main lobe in an effective sensitivity pattern associated with the radar antenna array, or by enhancing the main lobe relative to the one or more side lobes. The algorithm may be further configured to use the enhanced main lobe to determine a spatial disposition or characteristic of one or more targets external to a vehicle.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A system for determining a spatial disposition or a characteristic of a target, said system comprising:
   a radar antenna array and one or more transceivers operably coupled to said radar antenna array, wherein said radar antenna array and said one or more transceivers are configured to be mounted on a terrestrial vehicle, wherein said radar antenna array and said one or more transceivers are configured to (i) transmit successive radar pulses, and (ii) receive a plurality of signals corresponding to at least a subset of said successive radar pulses, which plurality of signals is generated upon the at least said subset of said successive radar pulses interacting with said target, wherein an effective sensitivity pattern associated with said radar antenna array and obtained from said plurality of signals comprises a main lobe and a side lobe, wherein said side lobe comprises an aliasing side lobe; and at least one controller operatively coupled to said radar antenna array, wherein said at least one controller is configured to (i) use (a) spatial information of said terrestrial vehicle obtained using a vehicle position sensor while said terrestrial vehicle is in motion and (b) a spatial configuration of said radar antenna array when said radar antenna array is mounted to said terrestrial vehicle, to attenuate said side lobe relative to said main lobe or enhance said main lobe relative to said side lobe, thereby providing an enhanced main lobe, and (ii) use said enhanced main lobe to determine said spatial disposition or said characteristic of said target.

2. The system of claim 1, wherein said radar antenna array comprises (i) a transmitting antenna and (ii) a receiving antenna.

3. The system of claim 1, wherein said radar antenna array comprises a virtual antenna.

4. The system of claim 1, wherein said radar antenna array is configured to be mounted on said terrestrial vehicle in a forward-facing direction or in a reverse-facing direction, relative to direction of motion of said terrestrial vehicle.

5. The system of claim 1, wherein said spatial configuration of said radar antenna array is based at least in part on an imaging region and an angular resolution within a field of detection of said radar antenna array, wherein said imaging region is defined separately for azimuth and elevation angles.

6. The system of claim 5, wherein an aperture size of said radar antenna array is based at least in part on (1) said angular resolution and (2) an operating wavelength of said radar antenna array, and wherein said at least one controller is configured to use said angular resolution and said operating wavelength at least in part to define a distance traveled by said terrestrial vehicle.

7. The system of claim 5, wherein said side lobe is located at an angular distance from said main lobe, and wherein said spatial configuration comprises a spacing between adjacent antennas of said radar antenna array such that said angular distance is greater than said imaging region.

8. The system of claim 5, wherein adjacent antennas of said radar antenna array are distributed at a spacing such that said side lobe lies outside of said imaging region.

9. The system of claim 5, wherein said imaging region covers at least ±10 degrees from a forward or reverse direction of motion of said terrestrial vehicle.

10. The system of claim 5, wherein said imaging region covers no more than ±60 degrees from a forward or reverse direction of motion of said terrestrial vehicle.

11. The system of claim 1, wherein said spatial information comprises a distance traveled by said terrestrial vehicle, wherein said spatial configuration of said radar antenna array comprises a spacing between adjacent antennas of said array, and wherein said controller is configured to attenuate said side lobe relative to said main lobe or enhance said main lobe relative to said side lobe based at least on (1) said distance traveled by said terrestrial vehicle and (2) said spacing between said adjacent antennas of said array, thereby providing said enhanced main lobe.

12. The system of claim 1, wherein said spatial configuration of said radar antenna array comprises a spacing between adjacent antennas of said radar antenna array, wherein said spacing is greater than one-half of an operating wavelength of said radar antenna array.

13. The system of claim 12, wherein said spacing is at least 10% greater than said one-half of said operating wavelength of said radar antenna array.

14. The system of claim 12, wherein said spacing is greater than about 2 millimeters.

15. The system of claim 1, wherein said radar antenna array is configured to transmit successive radar pulses at a pulse repetition frequency such that when said terrestrial vehicle is in motion, a change in position of said terrestrial vehicle between two successive radar pulses is from about one-quarter to about six times of an operating wavelength of said radar antenna array.

16. The system of claim 15, wherein said change in position of said terrestrial vehicle between two successive radar pulses is less than about one-half of said operating wavelength of said radar antenna array.

17. The system of claim 1, wherein said vehicle position sensor comprises at least one member selected from the group consisting of an inertial measurement unit, a global positioning system sensor, a camera, a light detection and ranging (lidar) unit, a wheel encoder, and a radar.

18. The system of claim 17, wherein said vehicle position sensor is located separately from said radar antenna array, and wherein said vehicle position sensor is configured to be mounted to said terrestrial vehicle.

19. The system of claim 1, wherein said at least one controller is configured to determine spatial dispositions or characteristics of a plurality of targets by attenuating a plurality of side lobes associated with said plurality of targets or enhancing a plurality of main lobes associated with said plurality of targets, to provide a plurality of enhanced main lobes, which plurality of targets comprises said target.

20. The system of claim 19, wherein said at least one controller is configured to differentiate between said spatial dispositions or said characteristics of said plurality of targets after said plurality of side lobes have been attenuated or said plurality of main lobes have been enhanced.

21. The system of claim 1, wherein said one or more transceivers comprise a transmitter and a receiver separate from said transmitter, wherein said transmitter is configured to transmit said successive radar pulses, and wherein said receiver is configured to receive said plurality of signals corresponding to said at least said subset of said successive radar pulses.

22. The system of claim 1, wherein said one or more transceivers comprises a transceiver that is configured to (i) transmit said successive radar pulses and (ii) receive said plurality of signals corresponding to said at least said subset of said successive radar pulses.

23. A method for identifying a position of a target, comprising (i) collecting radar data from an environment external to a terrestrial vehicle using a radar antenna array mounted on said terrestrial vehicle, wherein said radar data comprises a main lobe and a side lobe, wherein said side lobe is an aliasing side lobe, (ii) collecting position information of said terrestrial vehicle using a vehicle position sensor, (iii) using at least said position information to attenuate said side lobe relative to said main lobe or enhance said main lobe relative to said side lobe, to yield an enhanced main lobe, and (iv) using said enhanced main lobe to identify said position of said target in said environment at a detection accuracy of at least 90% when said target has a size of at least 0.2 meters and is located at a distance of at least 1 meter from said terrestrial vehicle.

24. The method of claim 23, wherein said radar antenna array is provided on a front side of said terrestrial vehicle in a forward-facing direction of said terrestrial vehicle, or provided on a rear side of said terrestrial vehicle in a reverse-facing direction of said terrestrial vehicle.

25. A method for determining a spatial disposition or a characteristic of a target, comprising:
   (a) providing, mounted on a terrestrial vehicle, a radar antenna array and one or more transceivers operably coupled to said radar antenna array;
   (b) using said radar antenna array and said one or more transceivers to: (i) transmit successive radar pulses, and (ii) receive a plurality of signals corresponding to at least a subset of said successive radar pulses, which plurality of signals is generated upon the at least said subset of said successive radar pulses interacting with said target, wherein an effective sensitivity pattern associated with said radar antenna array and obtained from said plurality of signals comprises a main lobe and a side lobe, wherein said side lobe comprises an aliasing side lobe;
   (c) using (i) position information of said terrestrial vehicle obtained by a vehicle position sensor while said vehicle is in motion and (ii) a spatial configuration of said radar antenna array when said radar antenna array is mounted to said terrestrial vehicle, to attenuate said side lobe relative to said main lobe or enhance said main lobe relative to said side lobe, thereby providing an enhanced main lobe; and
   (d) using said enhanced main lobe to determine said spatial disposition or said characteristic of said target.

26. The method of claim 25, wherein said spatial disposition or said characteristic of said target is determined substantially in real time while said terrestrial vehicle is in motion relative to said target.

27. The method of claim 25, wherein said radar antenna array is mounted on said terrestrial vehicle in a forward-facing direction or in a reverse-facing direction, relative to a direction of motion of said terrestrial vehicle.

28. The method of claim 25, wherein said spatial configuration of said radar antenna array comprises a spacing between adjacent antennas of said radar antenna array, wherein said spacing is greater than one-half of an operating wavelength of said radar antenna array.

29. The method of claim 25, further comprising determining spatial dispositions or characteristics of a plurality of targets by attenuating a plurality of side lobes associated with said plurality of targets or enhancing a plurality of main lobes associated with said plurality of targets, to provide a plurality of enhanced main lobes, which plurality of targets comprises said target.

30. The method of claim 29, further comprising: differentiating between said spatial dispositions or said characteristics of said plurality of targets after said plurality of side lobes have been attenuated or said plurality of main lobes have been enhanced.

* * * * *